(12) United States Patent
Sites

(10) Patent No.: US 11,799,906 B2
(45) Date of Patent: *Oct. 24, 2023

(54) SYSTEMS AND METHODS FOR ARTIFICIAL INTELLIGENCE DRIVEN AGENT CAMPAIGN CONTROLLER

(71) Applicant: KnowBe4, Inc., Clearwater, FL (US)

(72) Inventor: Eric Sites, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 285 days.

This patent is subject to a terminal disclaimer.

(21) Appl. No.: 17/158,704

(22) Filed: Jan. 26, 2021

(65) Prior Publication Data
US 2021/0152597 A1 May 20, 2021

Related U.S. Application Data

(63) Continuation of application No. 16/374,386, filed on Apr. 3, 2019, now Pat. No. 10,917,432, which is a
(Continued)

(51) Int. Cl.
*H04L 9/40* (2022.01)
*G06N 3/082* (2023.01)
(Continued)

(52) U.S. Cl.
CPC ........ *H04L 63/1483* (2013.01); *G06F 21/552* (2013.01); *G06F 21/577* (2013.01);
(Continued)

(58) Field of Classification Search
CPC . H04L 63/1483; G06F 21/552; G06F 21/577; G06N 3/082
See application file for complete search history.

(56) References Cited

U.S. PATENT DOCUMENTS

| 7,599,992 B2 | 10/2009 | Nakajima |
| 8,041,769 B2 | 10/2011 | Shraim et al. |

(Continued)

FOREIGN PATENT DOCUMENTS

| EP | 3 582 468 A1 | 12/2019 |
| WO | WO-2016/164844 A1 | 10/2016 |

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.
(Continued)

*Primary Examiner* — Oleg Korsak
(74) *Attorney, Agent, or Firm* — Foley & Lardner LLP

(57) ABSTRACT

The present disclose describes systems and methods for creating a simulated phishing campaign for a user based on at least a history of the user with respect to simulated phishing campaigns. A database may be configured to store simulated phishing campaign history of a user, the simulated phishing campaign history comprising information on events associated with the user during one or more previous simulated phishing campaigns, A campaign controller may identify the simulated phishing campaign history of the user from the database, determine based at least on the simulated phishing campaign history of the user, a model from a plurality of models for creating a simulated phishing campaign directed to the user; and create, responsive to the determination, the simulated phishing campaign using the model.

20 Claims, 14 Drawing Sheets

Related U.S. Application Data continuation of application No. 15/829,720, filed on Dec. 1, 2017, now Pat. No. 10,257,225.

(51) Int. Cl.
*G06F 21/55* (2013.01)
*G06F 21/57* (2013.01)
*G06N 3/084* (2023.01)
*G06N 3/044* (2023.01)
*G06N 3/047* (2023.01)

(52) U.S. Cl.
CPC ............ *G06N 3/082* (2013.01); *G06N 3/084* (2013.01); *G06N 3/044* (2023.01); *G06N 3/047* (2023.01); *H04L 63/1491* (2013.01)

(56) References Cited

U.S. PATENT DOCUMENTS

| | | | |
|---|---|---|---|
| 8,464,346 B2 | 6/2013 | Barai et al. | |
| 8,484,741 B1 | 7/2013 | Chapman | |
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,373,267 B2 | 6/2016 | Sadeh-Koniecpol et al. | |
| 9,398,029 B2 | 7/2016 | Sadeh-Koniecpol et al. | |
| 9,398,038 B2 | 7/2016 | Higbee et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,729,573 B2 | 8/2017 | Gatti | |
| 9,774,626 B1 | 9/2017 | Himler et al. | |
| 9,813,454 B2 | 11/2017 | Sadeh-Koniecpol et al. | |
| 9,870,715 B2 | 1/2018 | Sadeh-Koniecpol et al. | |
| 9,876,753 B1 | 1/2018 | Hawthorn | |
| 9,894,092 B2 | 2/2018 | Irimie et al. | |
| 9,906,539 B2 | 2/2018 | Higbee et al. | |
| 9,906,554 B2 | 2/2018 | Higbee et al. | |
| 9,906,555 B1 * | 2/2018 | Kras | H04L 63/1483 |
| 9,912,687 B1 | 3/2018 | Wescoe et al. | |
| 9,942,249 B2 | 4/2018 | Gatti | |
| 9,998,480 B1 | 6/2018 | Gates et al. | |
| 10,243,904 B1 | 3/2019 | Wescoe et al. | |
| 10,257,225 B1 * | 4/2019 | Sites | H04L 63/1483 |
| 10,313,387 B1 * | 6/2019 | Kras | H04L 63/1483 |
| 10,764,317 B2 * | 9/2020 | Irimie | H04W 12/122 |
| 10,812,527 B2 * | 10/2020 | Irimie | H04L 63/1483 |
| 10,839,083 B2 * | 11/2020 | Sjouwerman | G06N 3/08 |
| 10,893,071 B2 * | 1/2021 | Irimie | G06F 21/552 |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2007/0142030 A1 | 6/2007 | Sinha et al. | |
| 2010/0211641 A1 | 8/2010 | Yih et al. | |
| 2010/0269175 A1 | 10/2010 | Stolfo et al. | |
| 2012/0124671 A1 | 5/2012 | Fritzson et al. | |
| 2012/0258437 A1 | 10/2012 | Sadeh-Koniecpol et al. | |
| 2013/0198846 A1 | 8/2013 | Chapman | |
| 2013/0203023 A1 | 8/2013 | Sadeh-Koniecpol et al. | |
| 2013/0219495 A1 | 8/2013 | Kulaga et al. | |
| 2013/0297375 A1 | 11/2013 | Chapman | |
| 2014/0173726 A1 | 6/2014 | Varenhorst | |
| 2014/0199663 A1 | 7/2014 | Sadeh-Koniecpol et al. | |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Barraclough et al. (Intelligent phishing detection and protection scheme for online transactions, Expert Systems with Applications 40 (2013) 4697-4706) (Year: 2013).

Final Office Action for U.S. Appl. No. 15/829,720, dated Aug. 9, 2018.

Final Office Action on U.S. Appl. No. 16/374,386 dated Sep. 14, 2020.

International Preliminary Report on Patentability for PCT/US2018/062807 dated Jun. 11, 2020; 9pgs.

International Search Report and Written Opinion for PCT/US2018/062807, dated Mar. 1, 2019.

Non-Final Office Action for U.S. Appl. No. 15/829,720, dated Apr. 24, 2018.

Non-Final Office Action on U.S. Appl. No. 16/374,386 dated Apr. 16, 2020.

Non-Final Office Action on U.S. Appl. No. 16/374,386 dated Nov. 6, 2020.

Notice of Allowance for U.S. Appl. No. 15/829,720, dated Nov. 23, 2018.

Notice of Allowance on U.S. Appl. No. 16/374,386 dated Dec. 16, 2020.

Palka et al., "Dynamic phishing content using generative grammars," Software Testing, Verification and Validation Workshops (ICSTW), 2015 IEEE Eighth International Conference, Date of Conference:Apr. 13-17, 2015,IEEE Xplore, pp. 1-8.

(56) References Cited

OTHER PUBLICATIONS

Wu, "Behavior-based spam detection using a hybrid method of rule-based techniques and neural networks", Expert Systems with Applications, Elsevier, vol. 36, 2009, pp. 4321-4330.

* cited by examiner

*400*

```
Identifying a simulated phishing campaign history of a user,
the simulated phishing campaign history comprising
information on events associated with the user during one or
more previous simulated phishing campaigns
400
```

```
Determining a model from a plurality of models for creating
a simulated phishing campaign directed to the user
420
```

```
Creating the simulated phishing campaign using the model
440
```

AIDA Campaign Creation Screen

Create New AIDA Campaign                                    ← Back to Campaigns Name         [My AIDA Campaign]
Start Time   [📅 03/02/2017] [🕐 01:45 PM] [(GMT-05:00) Eastern Time (US & Canada) ▼]
User Groups  [All Users ▼]
Allow text messages  ☑ ⓘ
Allow voip calls     ☑ ⓘ

[Create AIDA Campaign]

*Fig. 6*

SYSTEMS AND METHODS FOR ARTIFICIAL INTELLIGENCE DRIVEN AGENT CAMPAIGN CONTROLLER

CROSS-REFERENCE TO RELATED APPLICATION

This patent application is a continuation of, and claims priority to and the benefit of U.S. patent application Ser. No. 16/374,386, titled "SYSTEMS AND METHODS FOR ARTIFICIAL INTELLIGENCE DRIVEN AGENT CAMPAIGN CONTROLLER," and filed Apr. 3, 2019, which is a continuation of, and claims priority to and the benefit of U.S. patent application Ser. No. 15/829,720, titled "SYSTEMS AND METHODS FOR ARTIFICIAL INTELLIGENCE DRIVEN AGENT CAMPAIGN CONTROLLER," and filed Dec. 1, 2017, the contents all of which are hereby incorporated herein by reference in its entirety for all purposes

FIELD OF THE DISCLOSURE

This disclosure generally relates to artificial intelligence driven security awareness systems for performing simulated phishing attacks.

BACKGROUND OF THE DISCLOSURE

It can be useful to perform simulated phishing attacks on an individual or set of individuals for the purposes of extracting information from a device used by the individuals. A phishing attack involves an attempt to acquire sensitive information such as usernames, passwords, credit card details, etc., often for malicious reasons, possible by masquerading as a trustworthy entity. For example, an email may be sent to a target, the email having an attachment that performs malicious actions when executed or a link to a webpage that either performs malicious actions when accessed or prompts the user to execute a malicious program. Malicious actions may include malicious data collection or actions harmful to the normal functioning of a device on which the email was activated, or any other malicious actions capable of being performed by a program or a set of programs.

BRIEF SUMMARY OF THE DISCLOSURE

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to lure a user (e.g., an employee of a business entity) into performing a target action. Performing a simulated phishing attack can help expose individuals that are more susceptible to phishing attacks, in addition to exposing weaknesses in the security infrastructure meant to protect users and/or devices from phishing attacks or other computerized, cyber, or digital attacks. Different users respond differently to different stimuli, and therefore the type of phishing attack that one user falls prey to may not be remotely tempting to a different user. The same user may also respond differently to a phishing attack depending on where the user is, who the user is with, what the user is doing, etc. These differences in user behaviors mean that the same simulated phishing attack does not have the same effectiveness in terms of teaching a user how to recognize threats, because not all users would have likely responded to a similar real phishing email in the first place.

Phishing attacks are rapidly getting more and more sophisticated, and the instigators of the phishing attacks have been able to mass scale spear phishing, which is individualized, real time, and reactive. In order for a security awareness system to be able to train users to detect such highly sophisticated and personalized attacks, the security awareness system needs to create a simulated phishing environment that is as sophisticated and individualized and synonymous with the kinds of attacks a user is likely to encounter in the real world.

A security awareness system can be configured to send multiple simulated phishing emails, text or short message service (SMS) messages, voice calls (e.g. via Voice Over Internet Protocol or VoIP), or Internet based communications (collectively referred to as simulated phishing messages or messages), varying the quantity, frequency, type, sophistication, timing, and combinations using machine learning algorithms or other forms of artificial intelligence.

In some implementations, the security awareness system may adaptively learn the best design of a simulated phishing campaign to get a user to perform the requested actions, such as clicking a hyperlink or opening a file. In some implementations, the system may adapt an ongoing campaign based on user's responses to messages in the campaign, along with the system's learned awareness. The learning process implemented by the security awareness system can be trained by observing the behavior of other users in the same company, other users in the same industry, other users that share similar attributes, all other users of the system, or users that have user attributes that match criteria set by the system, or that match attributes of a subset of other users in the system.

The system can record when and how the user action was performed and can produce reports about the actions. The reports can track the number of users the simulated phishing messages were sent to, whether the messages were successfully delivered, whether a user performed an action, whether a user performed a requested action, when an action or requested action was performed, and a combination and timing of messages that induced a user to perform a requested action. In some implementations, the system may provide training on why a user should not have performed a requested action at the time that the user performs the requested action. In some implementations, the system may enroll the user in training to be performed in the future. In some implementations, the system may add the user to a group of users.

The security awareness system may establish a plurality of artificial intelligence models that are used for creating and communicating simulated phishing messages to users in a simulated phishing campaign. In some embodiment, the models can be trained to represent a predetermined persona, and the model can be used during the simulated phishing campaign to determine an appropriate type of simulated phishing message, content of a simulated phishing message, timing of or between simulated phishing messages, and other parameters of simulated phishing messages and simulated phishing campaigns.

In one embodiment, a campaign controller creates a simulated phishing campaign for a user by determining a model to user for the simulated phishing campaign based on identifying the user's simulated phishing campaign history and using the model to create the simulated phishing campaign.

In some embodiments, the user's history with respect to simulated phishing campaigns is stored in an actions table for the user, wherein the action table stores all the activity associated with the user from previous simulated phishing campaigns.

In one embodiment, the campaign controller identifies one or more simulated phishing training programs taken by the user and uses this information along with the user's history with respect to simulated phishing campaigns to determine the model.

In some embodiments, the campaign controller additionally identifies one or more attributes of the user and uses this information along with other information, for example the user's history with respect to simulated phishing campaigns and simulated phishing training, to determine the model.

In some examples the campaign controller further uses the information to determine a template to use for a simulated phishing campaign and/or content within the template to use for a simulated phishing campaign.

In one embodiment, the campaign controller uses the information about the user to determine one or more of the frequency and timing of simulated phishing communications for the simulated phishing campaign, and one or more types of training for the user if the user interacts with a link of a simulated phishing communication of the simulated phishing campaign.

In some embodiments, the campaign controller may use the information about the user to classify the user into a cluster of a plurality of clusters, wherein the cluster corresponds to a model of the plurality of models. The campaign controller may also use the information about the user to classify the user into a cluster of a plurality of clusters corresponding to one or more timing models. In some examples, the timing models identify an hour of the day for communicating a simulated phishing communication of the simulated phishing campaign. In some examples, the timing models identify a number of times to communicating a simulated phishing communication of the simulated phishing campaign.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 depicts an implementation of a method for creating a simulated phishing campaign for a user based at least on a history of the user with respect to simulated phishing campaigns;

FIG. 5 depicts an example output of a system monitoring module monitoring the creation of one or more models;

FIG. 6 depicts an example input screen for a company administrator console to create an AIDA campaign.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes an artificial intelligence network and environment which may be useful for practicing embodiments described herein.

Section C describes embodiments of systems and methods for creating, controlling and executing simulated phishing campaigns using artificial intelligence as part of a security awareness system.

Section D describes embodiments of systems and methods for generating, revising, and tuning artificial intelligence models for use as part of a security awareness system.

A. Computing and Network Environment

Figure 1A:
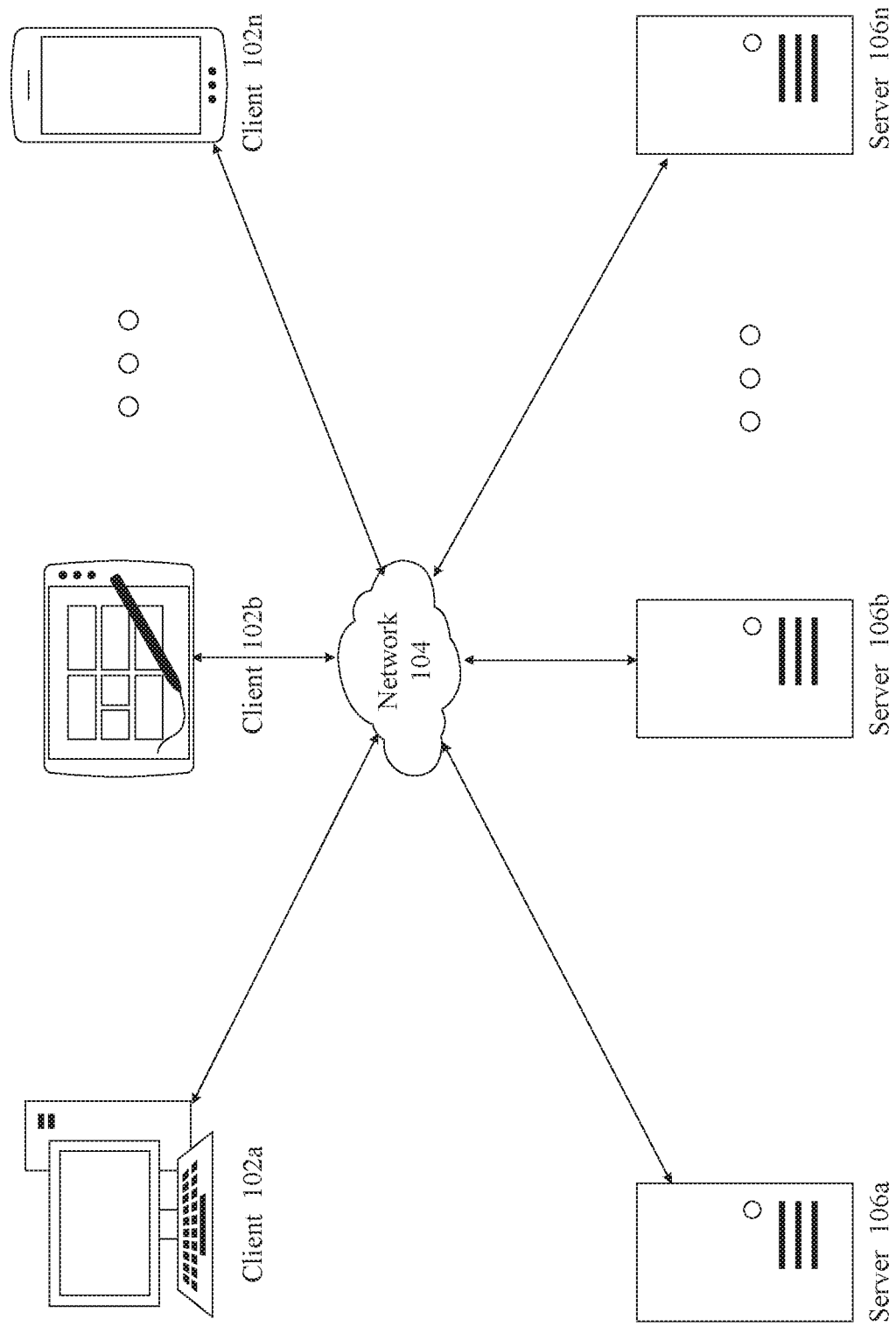
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In brief overview, the network environment includes one or more clients 102*a*-102*n* (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106*a*-106*n* (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
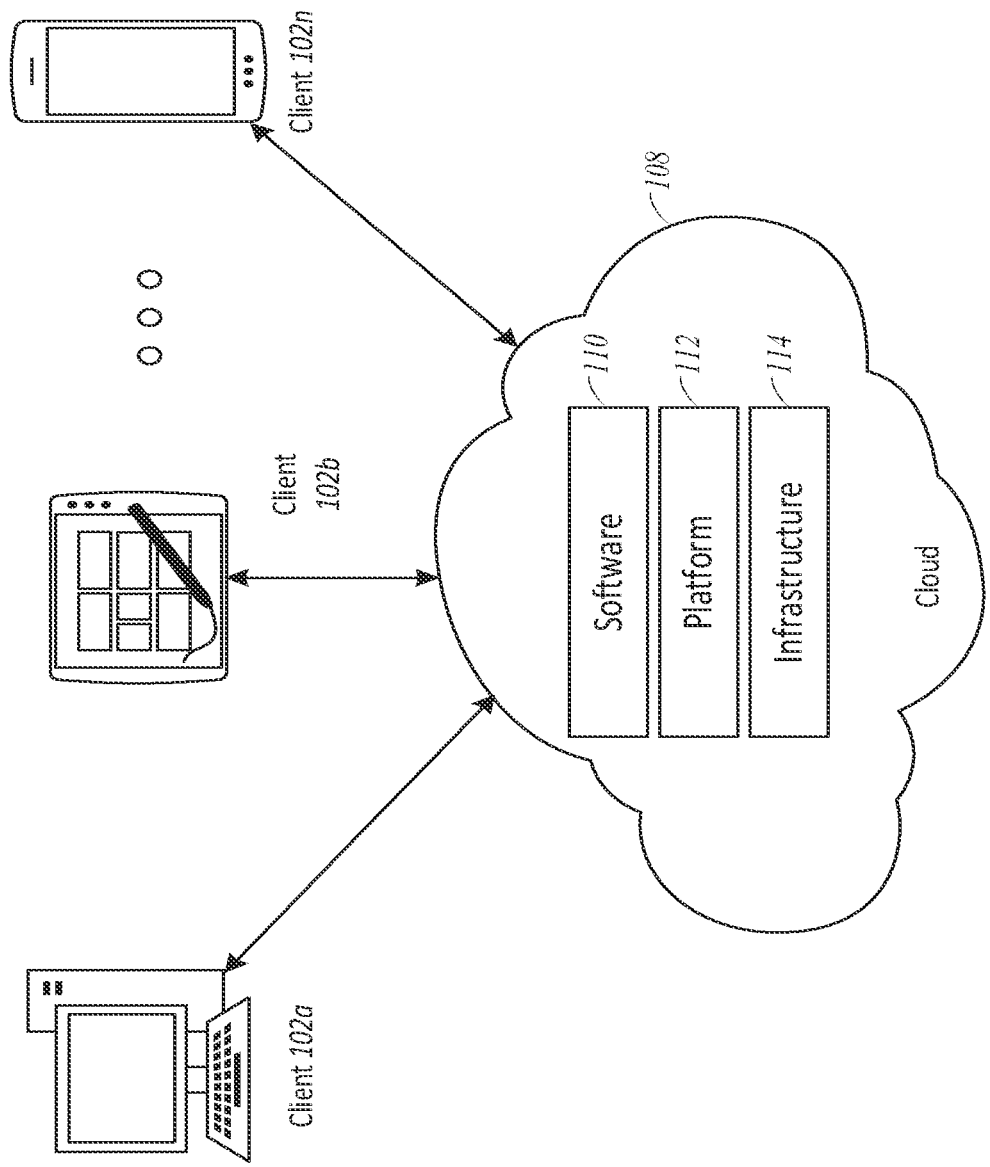
FIG. 1B is a block diagram depicting a could computing environment comprising client device in communication with cloud service providers.

Referring to FIG. 1B, a cloud computing environment is depicted. A could computing environment may provide client 102 with one or more resources provided by a network environment. The could computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e g Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
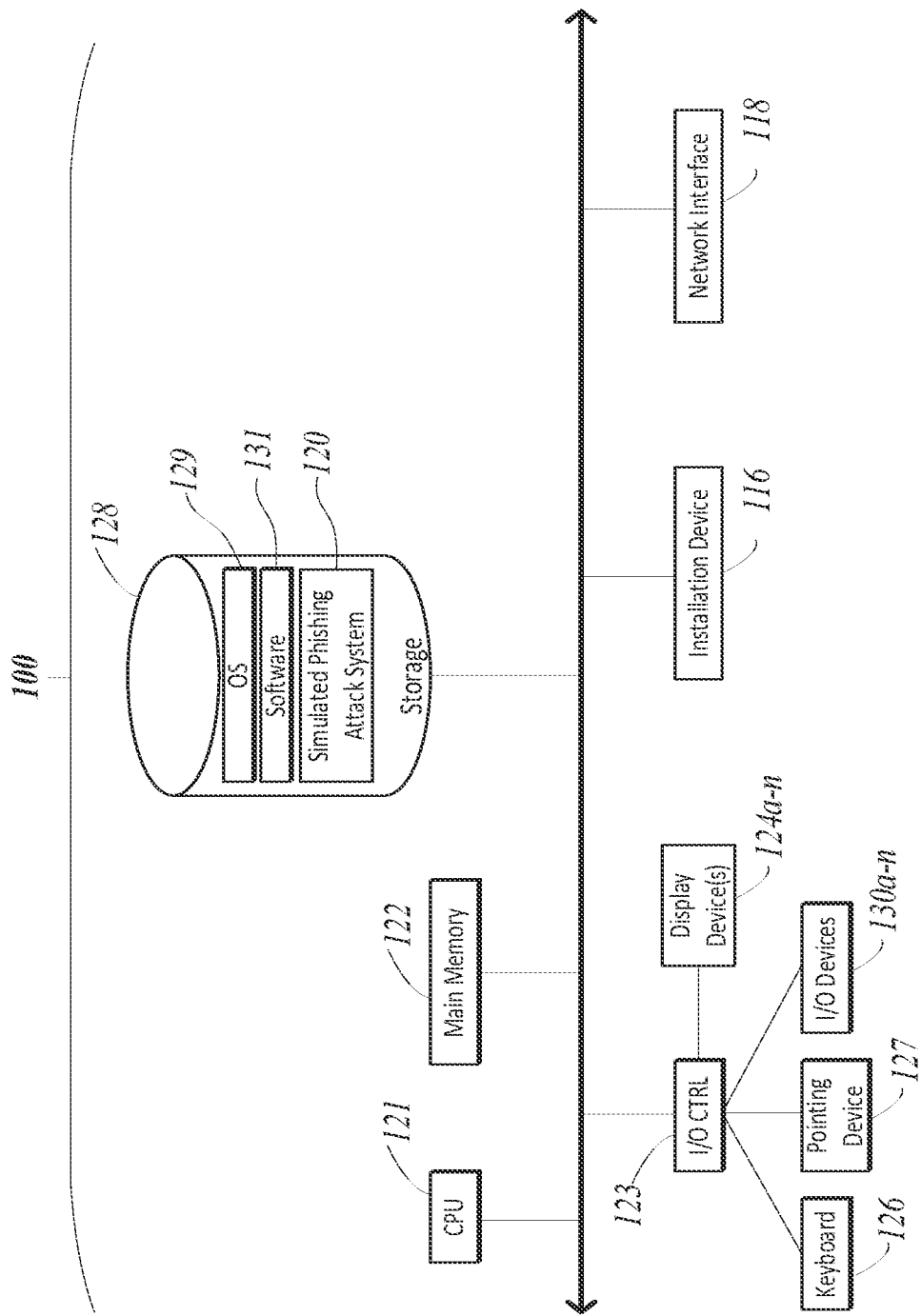
FIGS. 1C and 1D are block diagrams depicting embodiments of computing devices useful in connection with the methods and systems described herein.
Figure 1D:
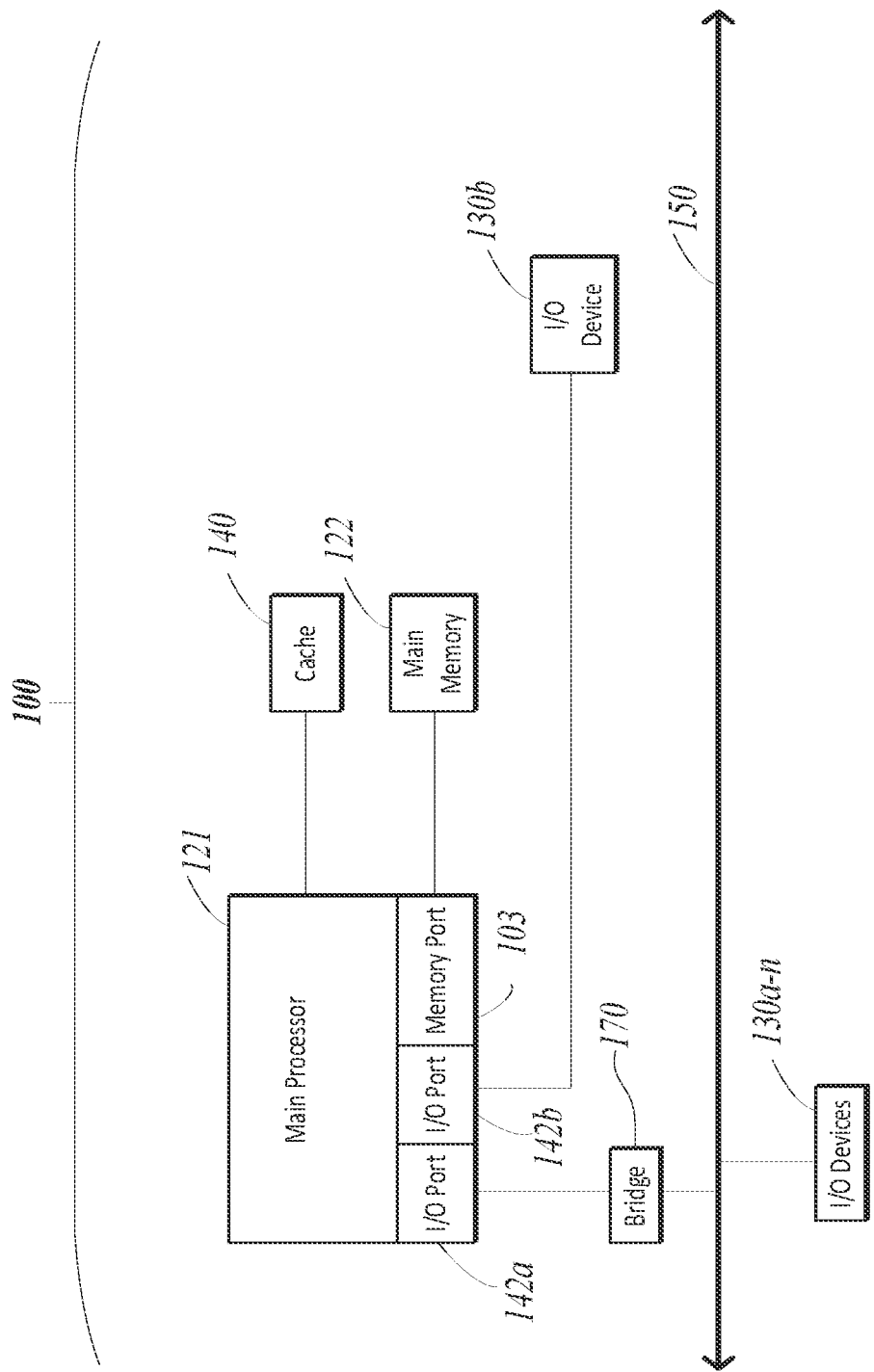

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system, software, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form.

As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Artificial Intelligence Network and Environment

An intelligent agent is any system or device that perceives its environment and takes actions to maximize its chances of success at some goal. The term artificial intelligence is used when a machine mimics cognitive functions such as learning and problem solving. One of the tools used for artificial intelligence is neural networks. Neural networks are modeled after the neurons in the human brain, where a trained algorithm determines an output response for input signals. The main categories of neural networks are feedforward neural networks, where the signal passes only in one direction, and recurrent neural networks, which allow feedback and short-term memory of previous input events.

A wide variety of platforms has allowed different aspects of AI to develop. Advances in deep artificial neural networks and distributed computing have led to a proliferation of software libraries, including Deeplearning4j, which is open-source software released under Apache License 2.0 and supported commercially by Skymind of San Francisco, Calif., and TensorFlow, an artificial intelligence system which is open-source released under Apache License 2.0, developed by Google, Inc.

Deep learning comprises an artificial neural network that is composed of many hidden layers between the inputs and outputs. The system moves from layer to layer to compile enough information to formulate the correct output for a given input. In artificial intelligence models for natural language processing, words can be represented (also described as embedded) as vectors. Vector space models (VSMs) represent or embed words in a continuous vector space where semantically similar words are mapped to nearby points (are embedded nearby each other). Two different approaches that leverage VSMs are count-based methods and predictive methods. Count-based methods compute the statistics of how often some word co-occurs with its neighbor words in a large text corpus, and then maps these count-statistics down to a small, dense vector for each word. Predictive models directly try to predict a word from its neighbors in terms of learned small, dense, embedding vectors.

Neural probabilistic language models are traditionally trained using the maximum likelihood (ML) principle to maximize the probability of the next word given previous words (or context) based on the compatibility of the next word with the context. The model is trained by maximizing its log-likelihood on a training set. The objective is maximized when the model assigns high probabilities to the words which are desired (the real words) and low probabilities to words that are not appropriate (the noise words).

A framework is provided that allows a model builder to express a machine learning algorithm symbolically, wherein the machine learning algorithm is modeled as a computation graph. This can interface with a set of Python classes and methods that provide an API interface, resulting in re-targetable systems that can run on different hardware.

The learned values from the recurrent neural network may also be serialized on disk for doing the inference step at a later time. These learned values are stored in multidimensional arrays that also contain shape and type information while in memory. The TensorFlow software libraries call these multidimensional arrays tensors.

C. Systems and Methods for Creating, Controlling and Executing Simulated Phishing Campaigns Using Artificial Intelligence.

The following describes systems and methods of creating, controlling and executing simulated phishing campaigns using artificial intelligence.

A system can be configured to send multiple simulated phishing emails, text messages, phone calls (e.g. via VoIP) and Internet based communications, varying the quantity, frequency, type, sophistication, content, timing, and combination of messages using machine learning algorithms or other forms of artificial intelligence. Such a system may be referred to as an artificial intelligence driven agent system, or AIDA system, or simply a system. The set of phishing emails, text messages, and/or phone calls may be referred to as a simulated phishing campaign. In some implementations, some or all messages (email, text messages, VoIP calls, Internet based communications) in a simulated phishing campaign after the first simulated phishing message may be used to direct the user to open the first simulated phishing message, or to open the latest simulated phishing message. In some implementations, simulated phishing messages of a campaign may be intended to lure the user to perform a different requested action, such as selecting a hyperlink in an email or text message, or returning a voice call.

In some implementations, the system may adaptively learn the best method (e.g., set of steps) and/or the best combination of messages to get the user to perform the requested action, such as interacting with a hyperlink or opening a file. The learning process implemented by the system can be trained by observing the behavior of other users in the same company or in the same industry, by observing the behavior of all other users of the system, or by observing the behavior of a subset of other users in the system based on one or more attributes of the subset of other users meeting one or more selected criteria.

The system can record when and how the action was performed and can produce reports about the actions. The reports can track the number of users the simulated messages were sent to, whether messages were successfully delivered, whether a user performed a requested action, when a requested action was performed, and a combination and timing of messages that induced a user to perform a requested action. In some implementations, the system may provide training on why a user should not have performed a requested action at the time that the user performs the requested action.

An AIDA system may use information from many sources to create, train, and refine artificial intelligence models to create simulated phishing messages for users. As examples, an AIDA system may extract information from the past efficiency of templates that have been used to phish users. An AIDA system may extract information that was made public due to a data breach. An AIDA system may extract information from past user communications with a security awareness system. An AIDA system may use information from user profiling, for example language, gender, political affiliation, interests and career information. An AIDA system may use information found on social media. An AIDA system may use information from logs from previous simulated phishing campaigns, including all actions performed on a user and all user actions performed. An AIDA system may use information from event logs, for example Windows event logs. An AIDA system may use information from learning management system (LMS) analysis, which may inform the AIDA systems as to exactly what training a user has had, where the user performed well and where the user struggled with the training that the user completed, and what the user should know. An AIDA system may use information from company profiling activities, for example email exposure check results, applications used, software as a service (SaaS) services used, etc. An AIDA system may use information from industry profiles corresponding to an industry that a user's company is associated with.

In some embodiments, an AIDA system is capable of performing risk analysis of users, groups of users, or a company. For example, an AIDA system may be able to perform a risk profile of a user with respect to wire transfer fraud, or IP theft. In some embodiments, an AIDA system can track events in a company and/or for a user in a company to identify one or more risk points. In some embodiments, an AIDA system can track information that a given user is exposed to in order to identify a risk point. For example, employees in a company that regularly deal with wire transfers may be likely to be at a higher risk for wire transfer fraud, and people that are exposed to sensitive information may be at a higher risk for leaking intellectual property.

In some embodiments, an AIDA campaign duration is limited to a fixed period of time, for example a fixed number of days. In some embodiments, an AIDA campaign will terminate once a certain percentage of users fail the campaign. In some embodiments, an AIDA campaign will terminate if a certain percentage of users fail the campaign in a first period of time. In some embodiments, an AIDA campaign stops for a specific user once that user fails a simulated phishing test as part of the campaign.

Figure 2A:
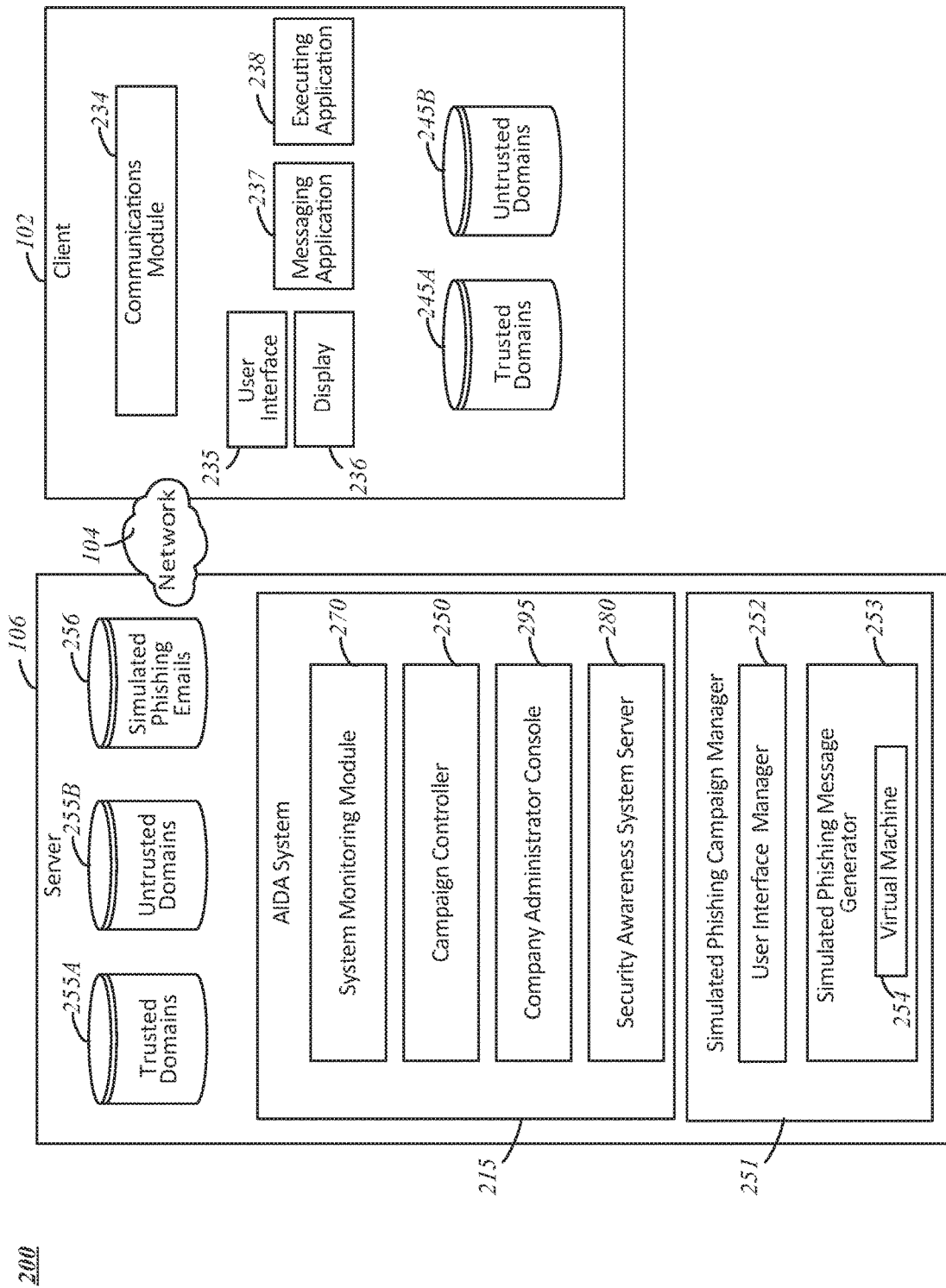
FIG. 2A depicts an implementation of some of the architecture of an implementation of a system capable of performing artificial intelligence driven simulated phishing attack campaigns as part of a security awareness system.

Referring to FIG. 2A in a general overview, FIG. 2A depicts some of the architecture of an implementation of a system 200 capable of creating, controlling and executing simulated phishing campaigns using artificial intelligence. In some implementations, the system 200 includes a server 106 and a client 102 and a network 104 allowing communication between these system components. The server 106 may include an AIDA system 215, a simulated phishing campaign manager 251, a trusted domains storage 255A, an untrusted domains storage 255B, and a simulated phishing emails storage 256. The AIDA system 215 may include a system monitoring module 270, a campaign controller 250, a company administrator console 295, and a security awareness system server 280. The simulated phishing campaign manager 251 may include a user interface manager 252 and a simulated phishing message generator 253. The simulated phishing message generator 253 may include a virtual machine 254. The client 102 may include a communications module 234, a user interface 235, a display 236, a messaging application 237, an executing application 238, a storage for trusted domains 245A, and a storage for untrusted domains 245B.

The server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Each of the server 106, the AIDA system 215, and the simulated phishing campaign manager 251, and any components or modules thereof, may comprise a program, service, task, script, library, application, or any type and form of executable instructions or code executable on one or more processors. Any of the server 106, the AIDA system 215, and/or the simulated phishing campaign manager 152 may be combined into one or more modules, applications, programs, services, tasks, scripts, libraries, applications, or executable code.

The simulated phishing campaign manager 251 includes a simulated phishing message generator 253, which may be implemented as or contain a virtual machine 254. Responsive to a user input, the simulated phishing campaign manager 251 generates a campaign for a simulated phishing attack, including one or more selected phishing message templates, one or more selected landing page templates, and one or more selected targeted user groups, in addition to other user input.

The simulated phishing campaign manager 251 may manage various aspects of a traditional simulated phishing attack campaign, for example a simulated phishing attack campaign that does not use an artificial intelligence driven agent (AIDA). For example, the simulated phishing campaign manager 251 may process input from the server 106 and/or may provide access as needed to various applications, modules, and other software components of server 106 to other various applications, modules, and other software components of server 106. The simulated phishing campaign manager 251 may monitor and control timing of various aspects of a simulated phishing attack campaign, may process requests for access to simulated attack campaign results, and/or may perform other tasks related to the management of a simulated phishing attack campaign.

In some embodiments, the simulated phishing campaign module 251 may be integrated with or coupled to memory 122. In some embodiments, the memory may include any type and form of storage, such as a database or file system. The memory 122 may store data such as parameters and scripts corresponding to the choices made by a server 106 through a simulated phishing campaign manager 251, e.g. as described above for a particular simulated phishing attack.

In an implementation, the simulated phishing campaign manager 251 includes a simulated phishing message generator 253. The simulated phishing message generator 253 may be integrated with or coupled to the memory 122 so as to provide the simulated phishing message generator 253 access to parameters associated with messaging choices made for a particular simulated campaign by e.g. the server 106. The simulated phishing message generator 264 may be integrated with or coupled to memory or a memory store or otherwise a storage, such as a database, containing simulated phishing emails 256. The simulated phishing message generator 253 may be an application, service, daemon, routine, or other executable logic for generating messages. The messages generated by the simulated phishing message generator 253 may be of any appropriate format. For example, they may be email messages, test or SMS messages, messages used by particular messaging applications such as, e.g. WhatsApp™, or any other type of message. Message types to be used in a particular attack may be selected by e.g. a server 106 using a simulated phishing campaign manager 251. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 254, or may simply be run on an operating system of the server 106, or may be run in any other appropriate environment. The messages may be generated to be formatted consistent with specific messaging platforms, for example Outlook 365, Outlook Web Access (OWA), Webmail, iOS, Gmail client, and so on.

In some embodiments, the simulated phishing message generator 253 can be configured to generate messages having the ability to traverse users who interact with the messages to a specific landing page.

In some embodiments, the simulated phishing message generator 253 can be configured to generate a simulated phishing email. The email can appear to be delivered from a trusted email address, such as the email address of an executive of the company at which the targeted user is employed. In addition, the email can have a "Subject:" field that is intended to cause the user to take an action, such as initiating a wire transfer. In some embodiments, the simulated phishing message generator 253 can generate one or more simulated phishing emails which are stored in the simulated phishing emails storage 256. In some embodiments, the simulated phishing message generator 253 can generate multiple instances of the email which may be delivered to multiple users, such as a subset of all of the employees of the company. In some embodiments, the simulated phishing message generator 253 can generate multiple instances of the email which may be delivered to a user group. For example, the server 106 can select any number of employees who should be targeted by a simulated attack, can create a user group and store this user group in the memory 122. The simulated phishing message generator 253 can retrieve this information from the memory 122 and can generate a set of emails similar to the email, each addressed to a respective target identified in the information stored in the memory 122. That is, the simulated phishing message generator 253 can generate the emails such that the "From:" and "Subject:" fields of each email are identical, while the "To:" field is adjusted according to the desired targets.

In an implementation, a simulated phishing campaign manager 251 may be e.g., another name for a system administrator, such as a security manager, a third-party security consultant, a risk assessor, or any other party that uses the simulated phishing campaign manager 251 installed on a server. The server 106 may wish to direct a simulated phishing attack by interacting with the simulated phishing campaign manager 251 installed on the server. The simulated phishing campaign manager 251 may be, for example, a desktop computer, a laptop computer, a mobile device, or any other suitable computing device. The simulated phishing campaign manager 251 may be e.g., an application on a device that allows for a user of the device to interact with the server 106 for e.g. purposes of creating, configuring, tailoring and/or executing a simulated phishing attack and/or viewing and/or processing and/or analyzing the results of a phishing attack.

In an implementation, the simulated phishing campaign manager 251, when executed, causes a graphical user interface to be displayed to the server 106. In other embodiments, the simulated phishing campaign manager 251 allows for user input through a non-graphical user interface, such as a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome, Microsoft Internet Explorer, or Mozilla Firefox provided by Mozilla Foundation of Mountain View, Calif.), or may be an application installed on a user device capable of opening a network connection to simulated phishing campaign manager 251, or may be any other type of interface.

In an implementation, the simulated phishing campaign manager 251 and/or server 106 may make choices concerning how a simulated phishing attack is to be carried out. For example, a graphical user interface run by the simulated phishing campaign manager 251 may be displayed to the server 106. An administrator, via the server 106, may input parameters for the attack that affect how it will be carried out. For example, via the server 106 an administrator may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner.

In an implementation, the simulated phishing campaign manager 251 may allow the server 106, such as via application programming interfaces (APIs), to access and/or change settings of an account maintained with any party involved with the attack, such as, for example, a third party security service provider, or may allow the server 106 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the server 106 and any other parties involved in the attack.

The system 200 also includes the client 102. A client may be a target of any simulated phishing attack. For example, the client may be an employee, member, or independent contractor working for an organization that is performing a security checkup or conducts ongoing simulated phishing attacks to maintain security. The client 102 may be any device used by the client. The client does not need to own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some implementations, client 102 may include a communications module 234. This may be a library, application programming interface (API), a set of scripts, or any other code that may facilitate communications between the client 102 and any of the server 106, a third-party server, or any other server. In some embodiments, the communications module 234 determines when to transmit information from the client 102 to the external servers via a network 104. In some embodiments, the information transmitted by the communications module 264 may correspond to a message, such as an email, generated by the messaging application 237.

In some embodiments, the client 102 may include a user interface 235 such as a keyboard, a mouse, a touch screen, or other appropriate user interface. This may be a user interface that is e.g. connected directly to a client 102, such as, for example, a keyboard connected to a mobile device, or may be connected indirectly to a client 102, such as, for example, a user interface of a client device used to access a server client 102. The client may include a display 236, such as a screen, a monitor connected to the device in any manner, or any other appropriate display.

In an implementation, the client 102 may include a messaging application 237. The messaging application 237 may be any application capable of viewing, editing, and/or sending messages. For example, the messaging application 237 may be an instance of an application that allows viewing of a desired message type, such as any web browser, a Gmail™ application, Microsoft Outlook™, WhatsApp™, a text messaging application, or any other appropriate application. In some embodiments, the messaging application 237 can be configured to display simulated phishing attack emails. Furthermore, the messaging application 237 can be configured to allow the target to generate reply messages or forwarded messages in response to the messages displayed by the messaging application 237.

The client 102 may include storage for trusted domains 245A and untrusted domains 245B. Each of the client 102, messaging application 237, executing application 238, client service 242, and user console 243 may comprise a program, service, task, script, library, application or any type and form of executable instructions or code executable on one or more processors. Any of the client 102, messaging application 237, executing application 238, client service 242, and/or user console 243 may be combined into one or more modules, applications, programs, services, tasks, scripts, libraries, applications, or executable code.

The client 102 receives messages sent by the server 106 based upon the campaign created and executed by the simulated phishing campaign manager 251 and/or by the AIDA system 215. The client 102 is able to receive the simulated phishing messages via the messaging application 237, display the received messages for the user using the display 236, and is able to accept user interaction via the user interface 235 responsive to the displayed message. In some embodiments, if the user interacts with the simulated phishing message, the client traverses to a landing page selected for the phishing campaign.

Figure 2B:
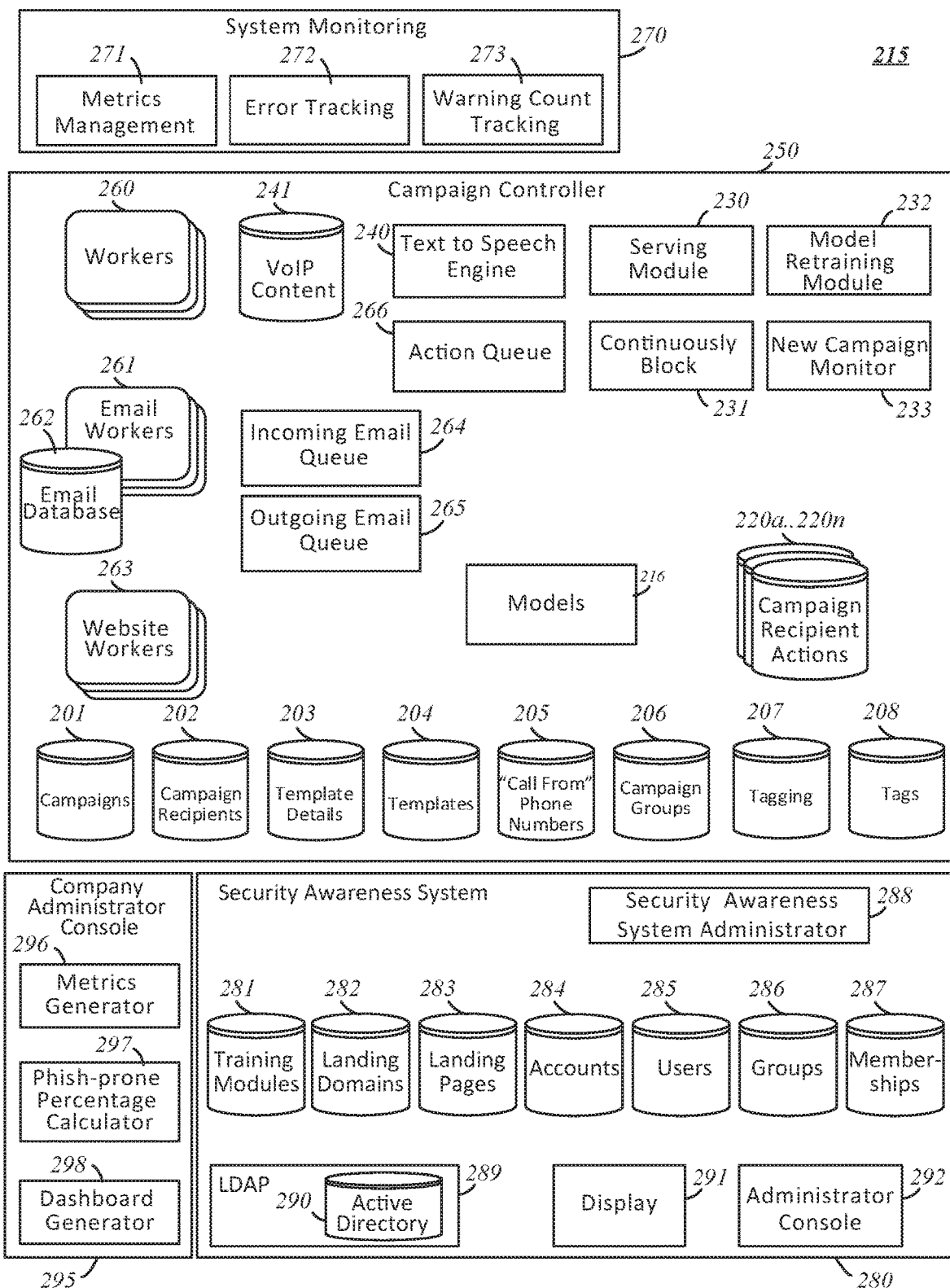
FIG. 2B depicts an implementation of an artificial intelligence driven agent (AIDA) system.

Referring to FIG. 2B, in a general overview, FIG. 2B depicts some of the architecture of an implementation of an AIDA system 215 capable of creating, controlling and executing simulated phishing campaigns using artificial intelligence. The AIDA system 215 may include a system monitoring module 270, a campaign controller 250, a company administrator console 295, and a security awareness system server 280. The system monitoring module 270 may include metrics management 271, error tracking 272, and warning count tracking 273. The company administrator console 295 may include metrics generator 296, phish-prone percentage calculator 297, and dashboard generator 298. Security awareness system server 280 may include security awareness system administrator 288, LDAP 289, active directory 290, a display 291, and an administrator console 292. Security awareness system server 280 may include a training modules storage 281, a landing domains storage 282, a landing pages storage 283, an accounts storage 284, a users storage 285, a groups storage 286, and a memberships storage 287. Campaign controller 250 may include a serving module 230, a continuously block 231, a model retraining module 232, and a new campaign monitor 233. Campaign controller 250 may include workers 260, email workers 261, and website workers 263. Campaign controller 250 may include a text to speech engine 240, an action queue 266, and incoming email queue 264, and an outgoing email queue 265. Campaign controller 250 may include a campaigns storage 201, a campaign recipients storage 202, a template details storage 203, a templates storage 204, a "call from" phone numbers storage 205, a campaign groups storage 206, a tagging storage 207, a tags storage 208, a models storage 216, one or more campaign recipient actions table storages 220a . . . 220n, a VoIP content storage 241, and an email database 262.

Any of the AIDA system 215, the system monitoring module 270, the campaign controller 250, company administrator console 295, a security awareness system server 280, the metrics management 271, error tracking 272, and warning count tracking 273 may comprise one or more a program, service, task, script, library, application, or any type and form of executable instructions or code executable on one or more processors.

In some embodiments, the system monitoring module or system monitor 270 keeps track of the health of functional blocks of the system 200. In some embodiments, the system monitoring module monitors the delays, queues, loads, and other parameters of the system 200, such that the security awareness system administrator 288 can keep track of the system 200. In some embodiments, the system monitoring module 270 includes metrics management 271, which keeps track of any performance metrics for any functional block or module in the system. In some embodiments, metrics management 271 keeps track of the number of messages processed in a given unit of time. In some embodiments, metrics management 271 keeps track of how many instances of each functional block are in use at a given time. In some embodiments, metrics management 271 keeps track of how many of each type of messages were sent. In some embodiments, metrics management 271 keeps track of how many actions were stored in the one or more actions table(s). In some embodiments, metrics management 271 keeps track of how many messages or different types were put into different queues. In some embodiments, the system monitoring module 270 includes error tracking 272. In some embodiments, error tracking 272 keeps track of actions in a queue which are not processed. In some embodiments, error tracking 272 keeps track of user email addresses that are incorrect. In some embodiments, error tracking 272 raises an error if the system monitoring module 270 cannot access one or more databases. In some embodiments, the system monitoring module 270 includes warning count tracking 273. In some embodiments, warning count tracking 273 keeps track of the number of warnings that have occurred in a period of time.

The data identified, monitored, obtained or processed by the system monitoring module may be stored in any type and form of database, files or logs. In some embodiments, such data may be stored in a time series type or based database. In some embodiments, the data for the system monitoring module may be stored in an open source time series database that is optimized for fast, high-availability storage and retrieval of time series data. An example of an open-source time series database is INFLUXDB, which is written in programming language GO and is provided by InfluxData of San Francisco, Calif. In some embodiments, the time series database is hosted in the cloud. In some embodiments, the time series database is local to the server 106.

The data that is stored by the system monitoring module may be processed, analyzed and displayed via a tool and/or user interface. The tool and/or user interface may allow and/or provide for a system administrator to query and alert on metrics and create a managed dashboard to visually display the data and metrics. In some embodiments, the time series data that is accessed by the system monitoring module is analyzed and visually displayed using an open source software platform to allow a security system administrator 288 to query and alert on metrics and to create dashboards to visually display time series data. An example of an open source software platform for time series analytics and visualization is Grafana, which is provided by GrafanaLabs (formerly known as Raintank) of New York, N.Y. In some embodiments, the analytics and visualization platform is hosted in the cloud. In some embodiments, the analytics and visualization platform is hosted locally on the server 106. In some embodiments, the analytics and visualization platform is an open source platform. In some embodiments, the analytics and visualization platform is proprietary to the security awareness system provider. In some embodiments, the system monitoring module 270 retrieves the time series data in one or more folders on the server 106. In some embodiments, the system monitoring module 270 uses plug-ins to retrieve the time series data In some embodiments, the system monitoring modules uses an API to enable a loading mechanism to retrieve the data.

In some embodiments, more than one instance of the system monitoring module 270 may exist. In some embodiments, there exists one or more instance of the system monitoring module 270 to monitor one or more model managers 370. In some embodiments, there exists one or more instance of the system monitoring module 270 to monitor the operation of one or more campaign controllers 250. In some embodiments, one or more instance of the system monitoring module 270 monitors both the model creation and the operation of the campaign controller 250. In some embodiments, one or more instance of the system monitoring module 270 keeps track of the health of one or more workers 260, one or more email workers, 261, one or more serving modules 230, one or more model controllers 320, and one or more Q&A workers 315.

AIDA system 215 may include a company administrator console 295. The company administrator console 295 enables an administrator of an account to create an AIDA simulated phishing campaign (also referred to as an AIDA campaign) using a user interface, such as graphical user interface or command line interface, and/or an application programming interface (API). In some embodiments, the company administrator, via the company administrator console 295, inputs the date and time that they want the AIDA campaign to start. In some embodiments, the company administrator inputs the time zone for the AIDA campaign. In some embodiments, the company administrator selects whether or not the AIDA campaign should allow text messages. In some embodiments, the company administrator selects whether or not the AIDA campaign should allow VoIP calls. In some embodiments, the company administrator selects the user groups that are to be included in the AIDA campaign. In some embodiments, the company administrator can select from one or more pre-existing user groups. In some embodiments, the company administrator can select from one or more users to create a new user group.

In some embodiments, the company administrator console 295 includes metrics generator 296 which tracks metrics about what happened in the AIDA campaign. In some embodiments, metrics generator 296 tracks the number of users of the AIDA campaign. In some embodiments, metrics generator 296 tracks the number of VoIP calls made in the AIDA campaign. In some embodiments, metrics generator 296 tracks the number of text messages sent in the AIDA campaign. In some embodiments, metrics generator 296 tracks the number of emails sent in the AIDA campaign. In some embodiments, metrics generator 296 tracks the number of user interactions with links in the AIDA campaign.

In some embodiments, the company administrator console 295 includes a metric generator or calculator 296, such as a phish-prone percentage calculator 297. The metric generator may establish, generate or calculate any type and form of metrics and/or statistics related to any of the data for any simulated phishing campaigns, any data processed, identified or provided by the campaign controller and/or and data stored in any of the models, and/or any data stored in any of the databases described herein. The metric generator may establish, generate or calculate any type and form of metrics and/or statistics related to any of the data stored in, with or associated with any of the following for example: campaign recipient actions 220, campaigns 201, campaign recipients 202, template details 203, templates 204, "call from" phone numbers 205, campaign groups 206, tagging 207, tags 208, training modules 281, landing domains 282, landing pages 283, accounts 284, users 285, groups 286, memberships 287, trusted domains 245 and 255, untrusted domains 245 and 255, simulated phishing emails 256, any of the models 216, metagraph 361, Q&A pairs 350, approved Q&A pairs 351, neurons 363, training Q&A pairs 352, Testing Q&A pairs 353, all configuration super parameters 363, groups 286, memberships 287, accounts 284 and users 285. The metrics and/or statistics may include any type and form of average, mean, summation, percentages, count and/or function of any one or more data items or combination of data items including over any time period or frequency or temporal parameters.

In some embodiments, phish-prone percentage calculator 297 calculates a phish-prone percentage as the percentage of users that interacted with a link in the AIDA campaign out of the total number of users that received messages as part of the campaign. In some embodiments, phish-prone percentage calculator 297 calculates a phish-prone percentage as the percentage of messages for which a user interacted with a link in the message as part of the AIDA campaign out of the total number of messages sent in the AIDA campaign. In some embodiments, phish-prone percentage calculator 297 calculates the phish-prone percentage across all of the campaigns that have been executed for the company. In some embodiments, phish-prone percentage calculator 297 calculates the phish-prone percentage for the most recent AIDA campaign for the company.

In some embodiments, the company administrator console 295 includes dashboard generator 298. In some embodiments, dashboard generator 298 displays an overview page which displays information about an AIDA campaign. In some embodiments, dashboard generator 298 generates a display of the number of times a user interacts with a link in a simulated phishing message that is part of an AIDA campaign over a given time period after the start of the AIDA campaign. In some embodiments, dashboard generator 298 generates a display of the number of times a user has interacted with a link in each of the first number of time periods after the start of an AIDA campaign. In some embodiments, the time period is one hour. In some embodiments, dashboard generator 298 displays a circle with a size that is proportionate to the number of interactions with a simulated phishing message in a time period, wherein the greater the number of user interactions with links in simulated phishing messages, the larger the size of the circle that is displayed. In some embodiments, dashboard generator 298 displays the status of the AIDA campaign as one of stopped, started, paused, ongoing, discontinued, completed, finished, cancelled, restarted, or aborted. In some embodiments, dashboard generator 298 displays the date and time that an AIDA campaign was created on. In some embodiments, dashboard generator 298 displays the date an AIDA campaign was started on. In some embodiments, dashboard generator 298 displays the end date of an AIDA campaign. In some embodiments, if the campaign is one of stopped, paused, ongoing, discontinued, cancelled, restarted, or aborted, the end date is displayed as "Not Finished". In some embodiments, the company administrator can highlight a specific recipient and see all the actions performed on that recipient (e.g. messages sent to the recipient, what detail page was used, when the message was sent, etc.) and all the actions that the recipient performed (e.g. clicked on a link in a text message, responded to an email, etc.). For example, if there is a record in the one or more campaign recipient actions table(s) indicating that the campaign controller 250 sent them an email, then the company administrator can click on this action and the company administrator console 295 displays a copy of the detail page of the template that was used to generate the email that the user received.

In some embodiments, dashboard generator 298 displays information about the browser, agent or platform that the user uses to view the messages of a campaign. In some embodiments, dashboard generator 298 displays information about multiple user's browsers, agents, or platforms in a pie chart format.

In some embodiments, dashboard generator 298 displays a user page which displays an AIDA campaign report which individually shows actions associated with each of the recipients of the AIDA campaign. In some embodiments, dashboard generator 298 displays one or more metrics of the campaigns across one or more tabs, and when a company administrator clicks on one of the tabs, more detailed information is shown to the company administrator. In one embodiment, dashboard generator 298 generates one or more tabs for AIDA campaign recipients, emails sent, emails delivered, emails opened, emails clicked, emails bounced, SMS messages sent, SMS messages clicked, SMS message errors, phone calls made, and phone call errors. In one embodiment, when the company administrator selects the recipients tab, the dashboard generator displays a list of the email addresses of all of the recipients of the AIDA campaign and an indication of whether or not they failed the campaign.

Figure 2C:
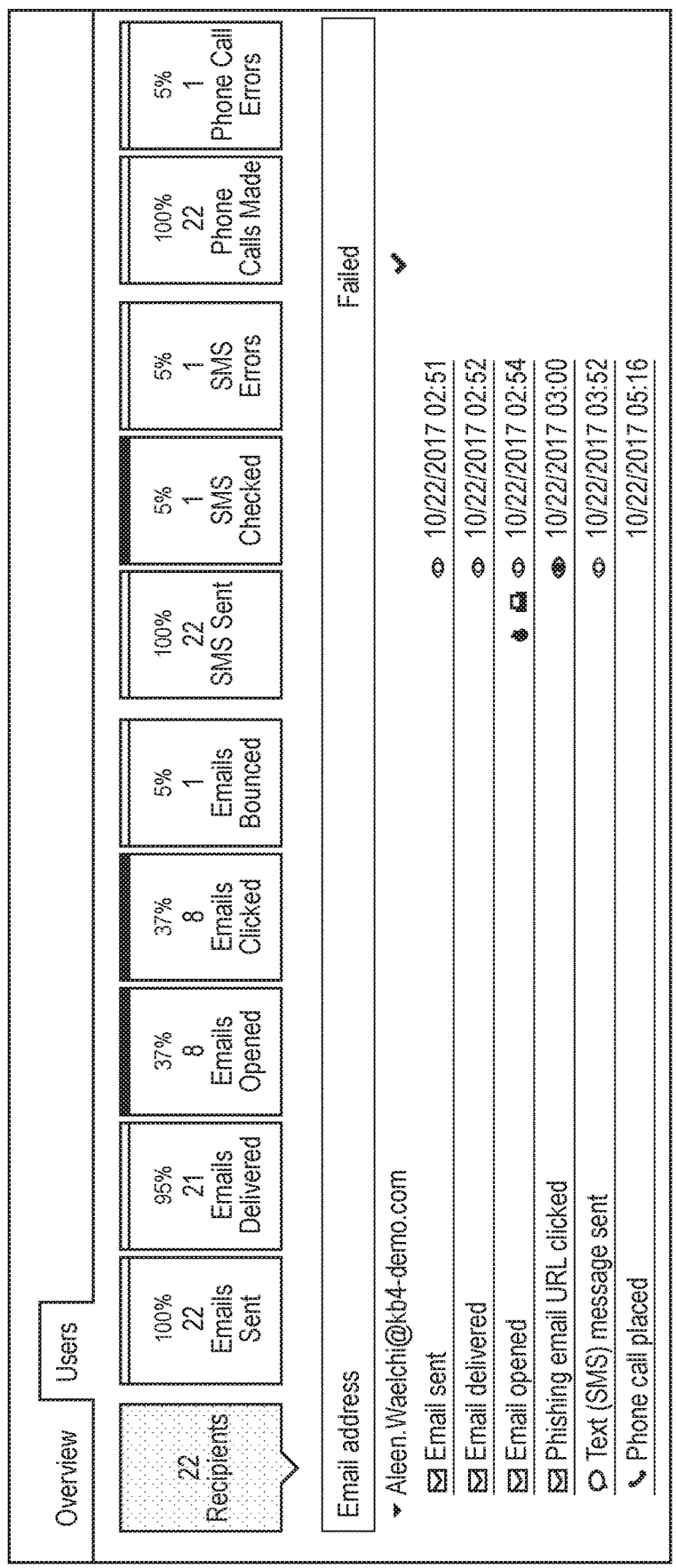
FIG. 2C depicts an example of a user interface and/or dashboard for displaying metrics and statistics about simulated phishing campaigns, showing recipient information.
Figure 2D:
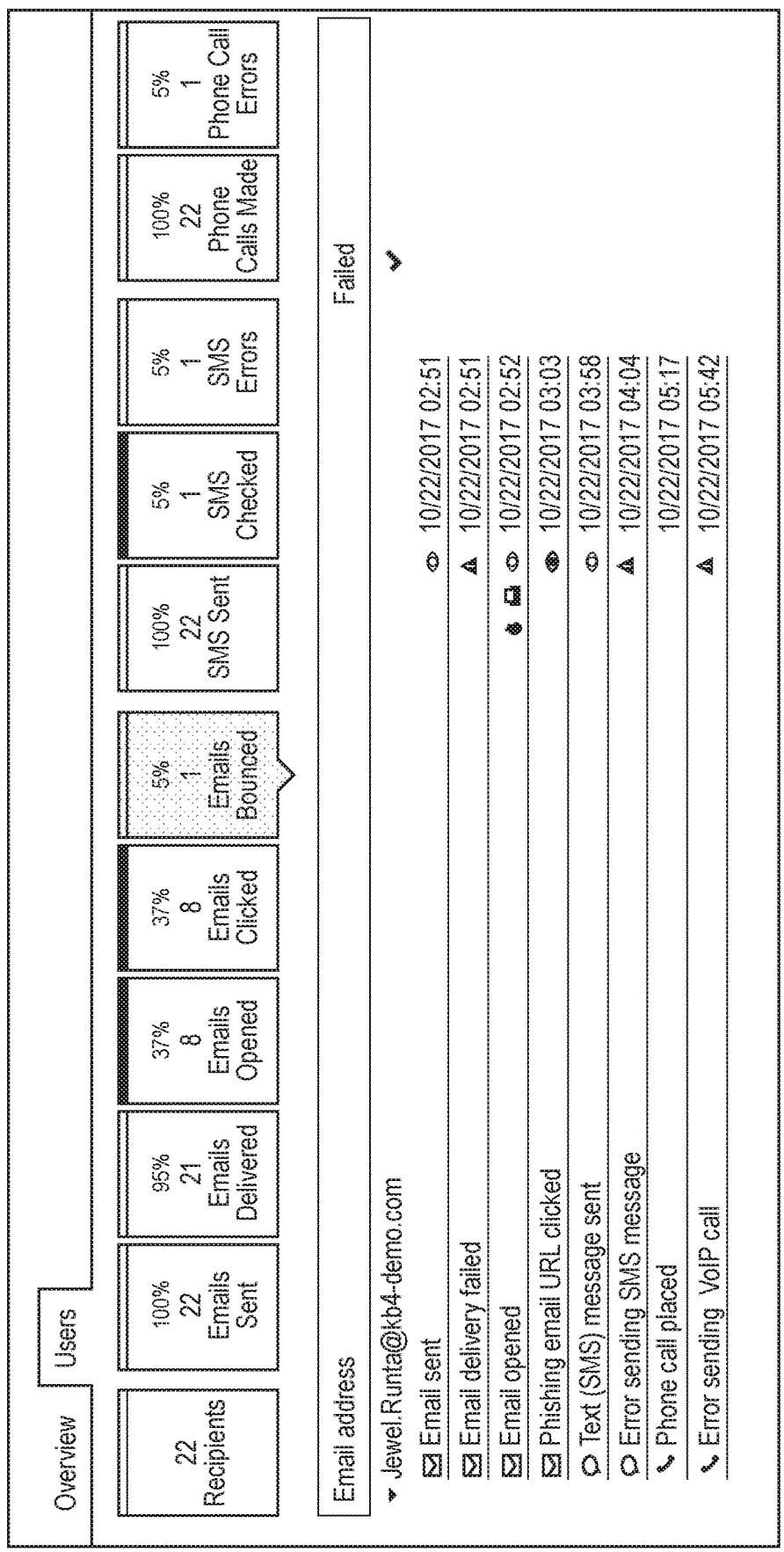
FIG. 2D depicts an example of a user interface and/or dashboard for displaying metrics and statistics about simulated phishing campaigns, showing bounced emails.
Figure 2E:
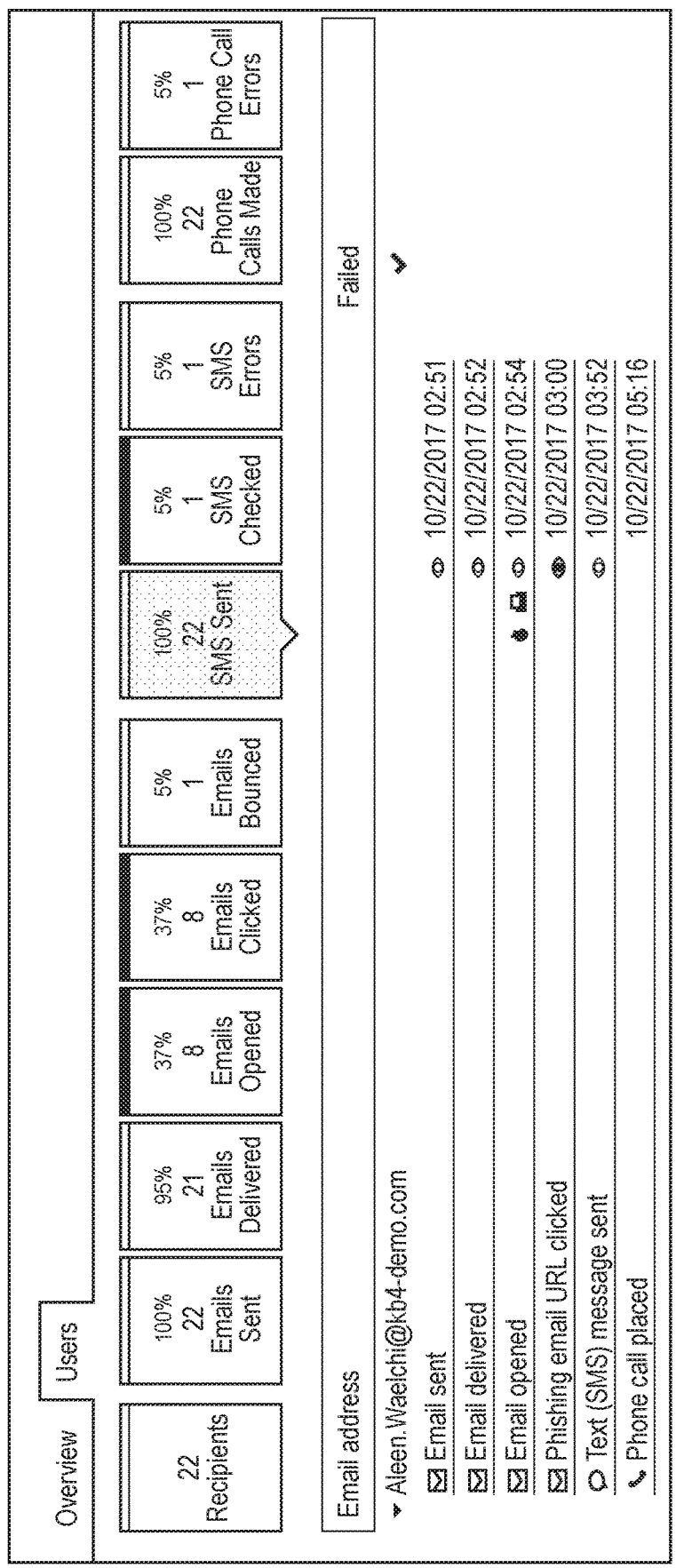
FIG. 2E depicts an example of a user interface and/or dashboard for displaying metrics and statistics about simulated phishing campaigns, showing SMS messages sent.

Referring briefly to FIGS. 2C, 2D and 2E are examples of user interfaces and/or dashboards for displaying metrics and statistics about simulated phishing campaigns. An administrator can click on any of the tabs of the example user interfaces to see any of the following information, including any details for the same: EMAILS DELIVERED, EMAILS OPENED, EMAILS CLICKED, EMAILS BOUNCED, SMS SENT, SMS CLICKED, SMS ERRORS, PHONE CALLS MADE, PHONE CALL ERRORS. The administrator can see for each user each email the user received, if the user clicked on a link in the email and/or each SMS sent, and/or each phone call placed. If the administrators clicks or hovers over any of the information indicators in the user interface of FIGS. 2C-2E, the system will provide more information on the cause of the error or issue.

AIDA system 215 may include a security awareness system 280 running on one or more servers, sometimes also referred to as security awareness system server. The security awareness system 280 may comprises one or more applications, programs, services, processes, libraries or any type and form of executable instructions executable on one or more computing devices. Security awareness system 280 provides a user interface for the security awareness system administrator 288 through the administrator console 292. In some embodiments, the administrator console 292 provides an interface for the security awareness system administrator 288 to make updates on one or more of the campaign controllers 250 and the workers 260 to enable the use of a specific version of a model. In some embodiments, the administrator console 292 on the security awareness system 280 provides an interface for security awareness system administrator 288 to add new versions of template detail pages for one or more templates. In some embodiments, the administrator console 292 on the security awareness system 280 provides an interface for security awareness system administrator 288 to specify the usage percentage for one or more template detail pages of a template, such that each template detail page gets used a specified percentage of the time. In some embodiments, the usage percentages for specific template detail pages and/or specific versions of template detail pages are calculated using count values for records that have the same template detail ID. Each time the template detail ID gets used, the percentage that each version of the template detail page has been used is calculated using the count values. The version of the template detail ID page that is the greatest amount less than the target usage percentage gets used in creating the message. In some embodiments, when the security system administrator 288 adds one of a new template detail page and a new version of a template detail page, the count values of records with the same template detail ID are set to zero.

In some embodiments, the security awareness system 280 includes display 291. The display 291 may provide a user interface and/or dashboard to show or display any results from execution of simulated phishing campaigns and allow a user to review any such results. In some embodiments, display 291 is used to display system information provided by the system monitoring module 270. In some embodiments, the display provides an administrator console interface or user interface from which a user can edit, create, and/or manage one or more of the following: accounts, phishing templates, landing pages, landing domains, templates, such as AIDA or training templates, training modules and any of the other components, modules, functions of any of the system described herein.

In some embodiments, the security awareness system 280 includes an active directory 290 and LDAP 289 and/or interfaces to an active directory 290 running or operating on one or more other devices using an LDAP (Lightweight Directory Access Protocol) protocol 289. In some embodiments, LDAP 289 is the protocol used to communicate with active directory 290. In some embodiments, LDAP 289 is a service that implements LDAP and provides services to access LDAP based systems, such as the active directory. In some embodiments, the server of the security awareness system implements or provides the active directory. In some embodiments, another server implements or provides the active directory. The security awareness system interfaces or accesses the active directory 290 to identify, obtain and/or extract user information, such as email address, first and last name, location, manager information and any other information about the user stored in the active directory. Any information stored or provided by the active directory 290 may be used by the campaign controller for creating, managing or executing simulated phishing campaigns. In some embodiments, the campaign controller accesses or interfaces to the active directory 290, such as via LDAP. In some embodiments, the campaign controller communicates or interfaces with the security awareness system to obtain the user information from the active directory 290. In some embodiments, users may be imported or added manually, such as if an active directory is not used.

In some embodiments, the security awareness system 280 includes a storage for training modules 281. In some embodiments, the security awareness system 280 includes a storage for landing domains 282. The security awareness system may store any of the training modules and/or landing domains in any type and form of database, including cloud based storage or local storage.

In some embodiments, the security awareness system 280 includes a storage for landing pages 283. A landing page may comprise a uniform resource locator or domains constructed to identify or point back to a server or system maintained or known by the server 280 and/or campaign controller. In some embodiments, the URL or domain identifies a tracking service or server of the system used for tracking. In some embodiments, the URL or domain is constructed to mimic, masquerade, disguise or simulate a domain or URL they are not. In some embodiments, the data structure for the landing page information stored for each landing page in the landing pages storage 283 includes one or more of a landing page ID, the HTML content of the landing page, the title of the landing page, one or more identifiers of the landing page, the account (company) ID that the landing page is to be used for, the landing page category ID, the date and time the landing page was created at, and the date and time the landing page was updated at. The categories identified by the category ID for the landing pages can be any predetermined category provided by the system or user generated or specified categories. The landing page categories may be used to group landing pages based on common traits or attributes. Some examples of categories include but are not limited to: point of failure video training, phishing for sensitive information, and error pages. The categories may be based on a type of campaigns, templates, models, personas, companies, groups of users or attributes of any of the foregoing. In some embodiments, landing pages may be assigned to one category, while in other embodiments, landing pages may be assigned to multiple categories.

In some embodiments, the security awareness system 280 includes a storage for accounts 284. In some embodiments, the data structure for the account information stored for each account in accounts storage 284 includes one or more of an account ID, a company name, a company address, a company phish-prone percentage, an industry ID, a company size, the business hours for the company, the days of the week that the company operates, the region of the company, and the time zone of the company. In some embodiments, the account storage 284 is a relational database. In some embodiments, the account storage relational database 284 has a relationship with users storage 285, wherein the relationship links one or more user records from users storage 285 to an account ID. In some embodiments, account storage relational database 284 has a relationship with groups storage 286, wherein the relationship links one or more group records from groups storage 286 to an account ID. In some embodiments, the account storage relational database 284 has a relationship with campaigns storage 201, wherein the relationship links one or more campaign records from campaigns storage 201 to an account ID.

In some embodiments, the security awareness system 280 includes a storage for users 285. In some embodiments, the data structure of the user information stored for each user in users storage 285 includes one or more of a user ID, a user email address, the account ID associated with a user, a user's name, a user's job title, a user's phone number, a user's mobile phone number, a user's location, what time zone a user is in, a user's division, a user's manager's name, a user's manager's email address, a user's employee number, a user's gender, and the date and time that a user's record was created and/or updated.

In some embodiments, the security awareness system 280 includes a storage for groups 286. In some embodiments, the data structure of the group information stored for each group in groups storage 286 includes one or more of a group ID, an account ID associated with a group, a name of the group, and a date and time that the group record was created and/or updated. In some embodiments, groups storage 286 is a relational database. In some embodiments, groups storage relational database 286 has a relationship with users storage 285, wherein the relationship links one or more users from users storage 285 to a group ID.

In some embodiments, the security awareness system 280 includes a storage for memberships 287. In some embodiments, membership storage 287 is a relational database which links users to groups. In some embodiments, the data structure of the membership information stored in memberships storage 287 includes one or more of a membership ID, a user ID, a group IP, and a date and time that a membership record was created and/or updated. In some embodiments, memberships storage 287 lists which users are in which groups. In some embodiments, a user can be in multiple groups.

AIDA system 215 may include one or more campaign controllers 250. In some embodiments, the campaign controller includes a serving module 230. The campaign controller includes, is configured with or implemented to have any of the instructions, function and/or logic to perform the operations and functionality of the campaign controller described herein, such as creating, managing and executing a simulated phishing campaign In some implementations, the serving module is the intelligent engine or brain of campaign controller 250 that receives and processes input related to a campaign and provides output regarding the operation, instruction or functions for a campaign The serving module 230 uses information, such as from any of the storage or databases described herein, to design a customized AIDA simulated phishing campaign for a given user, such as a campaign that is likely to have the highest probability of getting that specific user to interact with a link. The serving module may use information about any results from executing simulated phishing campaigns for that user and/or other users.

In some embodiments, design choices for an AIDA campaign include choice of model, choice of template including detail pages that will get used, when to start the campaign, duration of the campaign, frequency or how often to test a campaign recipient, type(s) of communications or messages (e.g., email, text, VoIP, etc.) of the campaign and a timing of the campaign. In some embodiments, the choice of a template for a given user may be made based on user attributes, or it may be randomly selected. In some embodiments, templates are available in advance, and each template could have any number of emails, text or VoIP calls, in any order. In some embodiments, the detailed pages and steps in a campaign are pre-determined when a template is created. In some embodiments, a state machine progresses an AIDA campaign through each stage of a template, performing actions that need to be performed with timing that is associated with that template. For example, the stages of a template may be "send an email", followed by "send a text", followed by "call". The template gets worked through from front to back until a user action occurs which indicates that they have failed the test and need to go for training. As soon as a user interacts with a link, the AIDA campaign for that user stops. A template may have any number of steps and any combination of different message types. In one embodiment, a template comprises one of each of an email, an SMS or text message, and a VoIP call.

In some embodiments, serving module 230 will provide to a campaign controller 250 combinations of data about the user and campaign controller 250 may use that data to further customize an AIDA campaign for that user. In some embodiments, data may include information about the back-off time to be used between messages, information about specific detail pages related to a template for a model selected for the user, and information representing specific wording of messages that are sent to the user. In some embodiments, serving module 230 knows which model and version of the model to use for a given user in a given campaign through reading information from template details storage 203. In some embodiments, serving module 230 periodically polls one or more model storages 216 in order to determine if a new model is available or a new version of a model is available. In some embodiments, serving module 230 will load the new model or the new version of the model to memory so that the model can be used by campaign controller 250. Multiple models can be loaded at one time, and multiple versions of a single model can be loaded at one time. In some embodiments, serving module 230 can view and access all models and all versions of all models.

In some embodiments, serving module 230 determines or selects a persona model from models storage 216 with which to phish a given AIDA campaign recipient for a given AIDA campaign. In some embodiments, serving module determines or selects a persona model that meets one or more criteria or threshold for a rate of success for a user or group of users. In some embodiments, serving module determines or selects a persona model that is more likely or most likely, such as via machine learning, to cause a user or group of users to interact with a link of a simulated phishing communication or message. In some embodiments, serving module 230 determines one or more templates and one or more detail pages within the one or more templates with which to phish a given AIDA campaign recipient for a given AIDA campaign. In some embodiments, serving module 230 determines one or more frequencies of an AIDA campaign and/or one or more timings of an AIDA campaign with which to phish a given AIDA campaign recipient for a given AIDA campaign. In one embodiment, serving module 230 determines one or more training modules for a user to undergo if the user fails a given AIDA campaign. In some embodiments, the model comprises a neural network that was created during a training process, combined with a metagraph which is a set of functions and parameters to call. In some embodiments, a metagraph is stored in metagraph storage 361. The metagraph stores may comprise a text file or a Protobuf file. In some embodiments, serving module 230 identifies, specifies or provides the set of functions and/or parameters to call, to execute the model.

In some embodiments, an AIDA campaign has a defined order in which to take actions for a campaign recipient, which is defined by a template. A template may comprise any type and form of data structure, configuration and/or parameters, set of data, policies and/or rules for specifying how to create, execute and/or manage a simulated phishing campaign. The template may specify any of the design choices for the campaign, including but not limited to model, template, detail pages that will get used, when to start the campaign, duration of the campaign, frequency or how often to communicate with a campaign recipient, type(s) of communications or messages (e.g., email, text, VoIP, etc.) of the campaign, order of communications/messages and a timing of the campaign, including any timing between communications/messages.

In some embodiments, campaign controller 250 may create a template for an AIDA campaign as the campaign is running based on a user's actions in response to an action sent to the user by campaign controller 250. In some embodiments, campaign controller 250 may modify an existing template during an AIDA campaign based on a user's actions in response to an action sent to the user by campaign controller 250. In some embodiments, campaign controller 250 may change the order of actions in the template based on a user's actions in response to an action sent to the user by campaign controller 250. In some embodiments campaign controller 250 may change the content of messages described by the template detail pages and to be sent to a user, based on a user's actions in response to an action sent to the user by campaign controller 250. In some embodiments campaign controller 250 may change the timing of messages sent to a user based on a user's actions in response to an action sent to the user by campaign controller 250. In some embodiments, serving module 230 performs these functions on behalf of campaign controller 250. In some embodiments, campaign controller 250 makes determinations based on a user's actions in response to an action sent to the user by campaign controller 250 in addition to other information that the system knows or can obtain about the user.

In some embodiments, when a recipient in a campaign responds to a message of the campaign, campaign controller 250 sends the recipient's response to serving module 230. In some embodiments, the recipient's response is capture as a string. In some embodiments, serving module 230 receives the recipient's response as a string and parses the string into individual words and runs the individual words into a model in order to determine an appropriate response that will encourage the recipient to interact with a link in a message that was sent to them. In some embodiments, serving module 230 sends the string received from campaign controller 250 along with a metagraph containing a set of steps to process the string to a model. In some embodiments, serving module 230 executes the metagraph using a TensorFlow SDK. In some embodiments, the metagraph is stored in metagraph storage 361. The SDK is a set of APIs and the order in which serving module 230 calls the APIs determines the program or order of actions to be executed. In some embodiments, serving module 230 parses the string into individual words and from the words creates vectors into a vocabulary array. In some embodiments, a vocabulary array comprises a multidimensional array containing words. In some embodiments, the vocabulary array is created using unique words sourced from the questions and answers that were used to train the model.

In some embodiments, serving module 230 passes an integer for every word of the string received from campaign controller 250 to the model. In some embodiments, serving module 230 sends a stop code after sending one or more integers to the model. In some embodiments, in response to receiving the inputs from serving module 230, the model returns to serving module 230 a series of integers. In some embodiments, serving module 230 translates the integers received from the model back into words using the vocabulary array. In some embodiments, serving module 230 reconstructs a string from the words from the vocabulary array corresponding to the integers, and sends the string to campaign controller 250. In some embodiments, campaign controller 250 uses this string to create a message to a campaign recipient.

In some embodiments, an appropriate response generated by serving module 230 may include another copy of the link that was in a previous message. In some embodiments, an appropriate response generated by serving module 230 may include a new link for the user to interact with. In some embodiments, serving module 230 generates an appropriate response to the campaign recipient according to a model selected for the campaign recipient for the current campaign.

In some embodiments, campaign controller 250 includes a model retraining module 232 or model retrainer. The model retraining module 232 periodically retrains one or more artificial intelligence models 216. The model retraining module 232 may initiate retraining for a model after the model has been used a number of times and there is history on how effective the model has been. The model retraining module 232 may initiate retraining for a model because new information pertaining to the model has been acquired by AIDA system 215. The model retraining module 232 may initiate retraining for a model once it has received and stored sufficient recipient feedback to the model from AIDA campaigns. Once the model training module 232 has created a new version of a model, the new version of the model is stored in the appropriate model storage 216. In some embodiments, testing such as A/B testing may be used in order to determine if one version of a model is more effective than a second version of the model.

In some embodiments, campaign controller 250 includes a storage for campaigns 201. In some embodiments, the data structure of the campaign information stored for each campaign in campaign storage 201 includes one or more of a campaign ID, an account ID, a campaign name, a date and time that the campaign is scheduled to start, a date and time that the campaign started, a date and time that the campaign ended, a group to add a user to if the user interacts with a link in a simulated phishing message, a number of delivered simulated phishing emails that were delivered for this campaign, a number of simulated phishing emails that bounced back, a number of simulated phishing emails that were opened, a number of simulated phishing emails that a recipient interacted with, a status of the campaign, a phish prone percentage, a time zone, a data and time that the campaign was created and/or updated, whether or not text and/or SMS messages are allowed for the campaign, and whether or not VoIP calls are allowed for the campaign. In some embodiments, campaign storage 201 is a relational database. In some embodiments, campaigns storage relational database 201 has a relationship with groups storage 286 and recipients storage 202, wherein the relationship links one or more recipients to a group, and one or more groups to a campaign. In some embodiments, when a new AIDA campaign is created by the security awareness system server 280, new campaign monitor 233 creates a record for the campaign in campaigns storage 201 when the campaign is created, based on information provided in the company administrator console 295. Records in campaigns storage 201 are associated with accounts from accounts storage 284 which contains information about the company the campaign is associated with, for example the industry that the company is in. In some embodiments, the new campaign monitor 233 detects that a new campaign has been created by looking for records in campaign storage 201 where one of the created at date and time, the start date and time, and the scheduled at data and time of the record is in the past and where the end date and time of the record is not indicated and/or is in the future. In some embodiments, new campaign monitor 233 detects that a new campaign is running or executing by checking whether or not a corresponding process or a new process is executing or running in memory. In some embodiments, when campaign controller 250 detects a new campaign record in campaigns storage 201, campaign controller 250 updates the campaign record in campaigns storage 201 with the actual campaign start time, and creates one or more records in campaign recipients storage 202, for each user that is a recipient for the campaign. In some embodiments, the recipients comprise users that are selected for the campaign by the company administrator in the company administrator console 295. In some embodiments, the recipients comprise users that are members of groups selected for the campaign by the company administrator in the company administrator console 295. The user record created in campaign recipients storage 202 is associated with the campaign record in campaigns storage 201 for the campaign. In some embodiments, information about a user that is a recipient for a campaign is extracted from users storage 285 when the user record is created in campaign recipients storage 202, for example a user's email address and mobile phone number, what account the user is on, and what campaign the user is in. In some embodiments, information about a user is uploaded by a company administrator when the user record is created in campaign recipients storage 202. In some embodiments, information about a user is created based on a synchronization process with the account active directory 290 or using the LDAP service 289 to access an account directory. In some embodiments, information about a user is created or obtained from an active directory service 290 or via an LDAP service 289, or otherwise using LDAP to communicate with an active directory.

In some embodiments, the campaign controller 250 includes continuously block 231. The continuously block may include any type and form of executable instructions performing the functions and operations described herein. In some embodiments, the continuously block is a component or module of the campaign controller. In some embodiments, the continuously block is a set of functions, operations and instructions of the campaign controller. In some embodiments, the continuously block is a logical and executable construct for performing a set of functions. As with some or all of the other components of the AIDA system 215, multiple instances of continuously block 231 may be instantiated simultaneously for scalability and redundancy. In some embodiments, for each active AIDA campaign, continuously block 231 dynamically creates a list of campaign recipients that have not interacted with a link (e.g., all the users that are still actively in campaigns, since once a user clicks on a link the campaign ends for that user) based on the time of the last action for the recipient. In some embodiments, continuously block 231 dynamically creates this list by running a SQL query that joins to campaigns storage 201, to campaign recipients storage 202, and to campaign recipient actions storage 220. In some embodiments, continuously block 231 retrieves a number of records from the dynamically created list of campaign recipients and checks the number of records to determine if AIDA system 215 should perform an action for a recipient. In some embodiments, continuously block 231 continues to retrieve a number of recipient records to check to see if the recipients should have an action performed for them. If the recipient needs an action to be performed, campaign controller 250 puts an action message into action queue 266 to perform the action for the recipient, and the recipient's action table 220 is updated with a new record for the action that has been put into the action queue 266. If all recipient actions have been performed and all recipient records have been checked, in some implementations continuously block 231 will sleep for a period of time and then restart checking recipient records. In some embodiments, action queue 266 is an Amazon Simple Queue Service (SQS) queue.

In some embodiments, continuously block 231 may use a state machine to determine if it is time to send a recipient an action. If a state machine is used to track the state of each recipient, the state machine is updated when campaign controller 250 puts the action for the recipient into action queue 266. In some embodiments, the recipient moves from one step in a template to a next step in a template when an action is put into action queue 266 for the recipient. In some embodiments, the recipient moves from one step in a template to a next step in a template when an action is performed on a recipient. In some embodiments, when an action is put into action queue 266 for a recipient, the action is written into campaign recipient action storage 220 as a new record. In some embodiments, when an action is performed on a recipient, the action is written into the campaign recipient action storage 220 as a new record.

In some embodiments, continuously block 231 examines campaign storage 201 to find all actively running campaigns, and then examines campaign recipients storage 202 for all recipients in actively running campaigns. In some embodiments, continuously block 231 looks at the date and time the recipient was last processed for needed actions (LastCheckedAt). In some embodiments, recipients are retrieved by continuously block 231 for processing based on their LastCheckedAt data and time, with the recipients with the oldest LastCheckedAt date and time being retrieved first. In some embodiments, when continuously block 231 retrieves the record of a recipient in an actively running campaign to be reviewed, that recipient's campaign recipient record is marked so that no other continuously block 231 will retrieve the same recipient's record.

In some embodiments, after an action is performed for a recipient, there is a minimum amount of time that must pass before a next action is performed for this recipient. In some embodiments, the amount of time between when an action is performed for a recipient and when the next action is performed for a recipient may be bounded by a minimum value and a maximum value. For example, AIDA system 215 may be configured such that at least one hour and not more than two and a half hours must pass between consecutive actions performed for a recipient in an active campaign. In some embodiments, the amount of time between when an action is performed for a recipient and when the next action is performed for a recipient may be randomly chosen. In some embodiments, the amount of time between when an action is performed for a recipient and when the next action is performed for a recipient may be randomly chosen within the bounds of a minimum value and a maximum value.

In some embodiments, after an action is performed by campaign controller 250 for a recipient of an active campaign, the LastCheckedAt data and time is set to one hour past the time when the action is performed. For example, in some embodiments, if an action is performed by campaign controller 250 of a recipient of an active campaign on January 1$^{st}$ at 7:00 a.m., the LastCheckedAt data and time is set to January 1$^{st}$ at 8:00 a.m. In some embodiments, the LastCheckedAt data and time is stored in campaign recipients storage 202 in a record for the recipient. Continuously block 231 determines which recipients are due for a next action by looking for recipients, wherein the LastCheckedAt date and time in the recipient record in the campaign recipients storage 202 is older than the present time. When the LastCheckedAt date and time in the recipient record in campaign recipients storage 202 is older than the present time, then continuously block 231 checks when the last action was sent to the recipient. In some embodiments, continuously block 231 determines when the last action was sent to the recipient by sorting the records in the one or more campaign recipient actions table(s) in descending order in which they were created, and selecting the most recent record based on the time at which that record was created, which is the LastSentAction date and time. Continuously block 231 then generates a random number representing a duration of time. In some embodiments, the random number is less than a preset maximum value for the amount of time between when an action is performed for a recipient and when the next action is performed for a recipient. Continuously block 231 adds the random number representing a duration in time to the LastSentAction date and time. If the sum of the LastSentAction data and time plus the random number presenting a duration in time is older than the current time, then continuously block 231 determines that it is time for the recipient to be sent an action. In some embodiments, continuously block 231 checks the one or more campaign recipient actions table(s) in the campaign recipient actions storage 220 periodically to see if any recipient needs to be sent an action.

If it is time to send a recipient a next action, then in some embodiments, campaign controller 250 moves to the next step in that recipient's template to determine what action to perform for that recipient. In some embodiments, campaign controller 250 determines a next action to perform for that recipient based on one or more of the recipient's responses to a previous action. In some embodiments, after campaign controller 250 puts an action to be sent to the recipient into action queue 266, continuously block 231 updates the LastCheckedAt date and time for that recipient to the current time plus a minimum back-off time before a next action can be sent to the recipient. In some embodiments, after the message is successfully delivered to the recipient, continuously block 231 updates the LastCheckedAt date and time for that recipient to the current time plus a minimum back-off time before a next action can be sent to the recipient.

In some embodiments, campaign controller 250 may utilize the LastCheckedAt date and time field in the campaign recipient record for a recipient to cause the AIDA system to ignore the recipient for a period of time and not send the recipient any actions. In some embodiments, campaign controller 250 retrieves the business hours start and business hours end files from the accounts table for the account associated with the recipient. If the current time is outside of business hours, then in some embodiments continuously block 231 will set the LastCheckedAt date and time to the start of the next business day so that the user isn't looked at by campaign controller 250 until then. In some embodiments, campaign controller 250 determines statutory or mandatory holidays based on a location or region of the recipient or the account associated with the recipient, and continuously block 231 will set the LastCheckedAt date and time to the start of the next working day after the statutory or mandatory holiday. In some embodiments, campaign controller 250 determines that the current date and time falls on a weekend, and continuously block 231 then sets the LastCheckedAt date and time to be the start of the first day after the weekend. It can be seen how the campaign controller 250 can use the LastCheckedAt date and time to insert any desired back-off duration between actions of the campaign for a recipient.

In some embodiments, continuously block 231 uses business logic based on one of a recipient, an account associated with the recipient, an attribute associated with the recipient, an attribute associated with the account associated with the recipient, and other information pertaining to the recipient in order to determine which recipient records to examine such that continuously block 231 does not have to look at all recipients that are in active campaigns on each review. In some embodiments, artificial intelligence based timing models will be used to determine the best timing for a next action for a given recipient in a given campaign, rather than using a random back off period.

In some embodiments, campaign controller 250 includes storage for campaign recipients 202. In some embodiments, security awareness system server 280 accesses recipient records in campaign recipients storage 202 to determine all the users that are in an AIDA campaign. In some embodiments, campaign controller 250 can determine whether a user has been a recipient in an AIDA campaign in the past by determining if a recipient record for the user exists in campaign recipients storage 202. Campaign controller 250 can determine which campaign or campaigns the user was a recipient for by reading the campaign ID in each of the recipient records for the user in campaign recipients storage 202. In some embodiments, the data structure of the campaign recipients information stored for each campaign recipient in campaign recipient storage 202 includes one or more of a recipient ID, a campaign ID, the recipients' user ID, the last time this recipient was processed for needed actions (LastSentAction date and time), an indication of the first next time that a recipient should be considered ready to receive a next campaign action (LastCheckedAt date and time), the recipient's email address, and the recipient's phone number. In some embodiments, if the user has not previously been part of an AIDA campaign, campaign controller 250 collects data including the attributes and features of the user from users storage 285. In some embodiments, the information that campaign controller 250 collects from users storage 285 includes a user's email address, a user's phone number, a user's mobile phone number, the account that the user is associated with (e.g. the company that the user is associated with), and other information that that can be accessed about the user from users storage 285. In some embodiments, if the user has not previously been part of an AIDA campaign, then campaign controller 250 collects data including the attributes and features of the account that the user is associated with from accounts storage 284. In some embodiments, the information that campaign controller 250 collects from accounts storage 284 includes the industry that the user's company is in, where the company is geographically located, the company's phish-prone percentage, and other information that can be access about the user's company from accounts storage 284. In some embodiments, campaign controller 250 collects and curates information about the user from one or more of the Internet, social media feeds, and reliable databases. In some embodiments, a unique record is created in campaign recipients storage 202 for a user for every different campaign and the unique record is associated with the campaign, such that there is more than one recipient record in campaign recipients storage 202 for a user.

In some embodiments, some of the data structure in campaign recipient storage 202 is filled in by one or more workers 260, such as when the recipient interacts with a simulated phishing message. A worker 260 may include any type and form of executable instructions performing the functions and operations described herein. In some embodiments, the worker is a component or module of the campaign controller. In some embodiments, the worker is a set of functions, operations and instructions of the campaign controller. In some embodiments, the worker is a logical and executable construct for performing a set of assigned functions. In some embodiments, a worker 260 will record the date and time when a recipient opened an email message. In some embodiments, a worker 260 will record a date and time when a recipient interacted with any of the links in an email or a text. In some embodiments, a worker 260 will record a date and time when an email was delivered to a recipient's email server. In some embodiments, a worker 260 will record a date and time when an email template has been processed and is waiting in the outgoing email queue 265. In some embodiments, a worker 260 will record a date and time when an email is sent to a recipient. In some embodiments, a worker 260 will record a data and time when all templates were delivered to this recipient. In some embodiments, the recipients' browser agent string, including one or more of a user agent, a platform, a browser, a browser version, and OS, and an IP address, will be recorded when the recipient clicks on a link in a simulated phishing message. In some embodiments, campaign recipients storage 202 is a relational database. In some embodiments, campaigns recipients storage relational database 202 has a relationship with campaign recipient actions storage 220a . . . 220n.

In some embodiments, campaign controller 250 includes a storage for template details 203. In some embodiments, the data structure of the template details information stored for each template detail record in template details storage 203 includes one or more of a template ID, settings for a service that describes the input one or more VoIP calls, settings for one or more text or SMS messages, settings for one or more email messages, and an ordinal field which contains the order of a collection of detail records for the template. In some embodiments, the data structure of the template details information stored for each template record in template details storage 203 includes a date and time that the record was created and/or updated. In some embodiments, a template detail record in template detail storage 203 can associate a template detail page to a landing domain.

In some embodiments, the settings for a service that describes the input for one or more VoIP calls include a script string. The script string may include the voice script to use for a VoIP call. In some embodiments, the settings for a service that describes the input for one or more VoIP calls includes a voice type to use to speak the script on a voice call. In some embodiments, the settings for a service that describes the input for one or more VoIP calls includes a language to use for a VoIP call. In some embodiments, the settings for a service that describes the input for one or more VoIP calls includes a counter which indicates the number of times to repeat the VoIP call voice script. In some embodiments, the settings for a service that describes the input for one or more VoIP calls includes a location of an audio file to be used for a VoIP call. In some embodiments, the audio file may be an MPEG-1 audio layer 3 (MP3) file, an MPEG-1 audio layer 4 (MP4) file, a pulse-code modulation (PCM) file, a waveform audio file format (WAV) file, an audio interchange file format (AIFF) file, an advanced audio coding (AAC) file, a windows media audio (WMA) file, a free lossless audio codec (FLAC) file, an Apple lossless audio codec (ALAC) file, a Window media audio (WMA) file, or any other audio file format. In some embodiments, the audio files that may be used as an input to one or more VoIP calls are stored in VoIP content storage 241. In some embodiments, a text to speech (TTS) engine 240 may be used to generate an audio file for one or more VoIP calls. In some embodiments, the text to be used by the TTS comes from serving module 230 of campaign controller 250.

In some embodiments, the settings for a service that describes the input for one or more SMS messages, text messages, or emails messages includes a string. The string may identify, contain or provide the body of the message. In some embodiments, the string comprises an identifier to file that has the body of the message. In some embodiments, the string comprises an identifier or key to a record or data in a database that has the body of the message In some embodiments, the string comprises an identifier to file that will be attached with the message. In some embodiments, the settings for a service that describes the input for one or more SMS messages, text messages, or emails messages includes a string which contains the subject of the message. In some embodiments, the settings for a service that describes the input for one or more SMS messages, text messages, or emails messages includes a string which indicates who or where the message is from. In some embodiments, the settings for a service that describes the input for one or more SMS messages, text messages, or emails messages includes a string which indicates a reply to address for the message. In some embodiments, the settings for a service that describes the input for one or more SMS messages, text messages, or emails messages includes a string which contains the name to display to indicate who or where the message is from. In some embodiments, the settings for a service that describes the input for one or more SMS messages, text messages, or emails messages includes a landing page ID which indicates the landing page to use for this message. In some embodiments, the settings for a service that describes the input for one or more SMS messages, text messages, or emails messages includes a landing domain ID which indicates the domain to use for a message. In some embodiments, the settings for a service that describes the input for one or more SMS messages, text messages, or emails messages includes a landing domain prefix or a landing domain suffix to add before the domain or at the end of a URL and before a slug. In some embodiments, the settings for a service that describes the input for one or more SMS messages, text messages, or emails messages includes a type which indicates whether the record is for an email, an SMS or text message, or a VoIP call.

In some embodiments, the service that provides SMS or text messages and VoIP calls is a cloud based communications platform as a service that enables communications between mobile devices, applications, services, and systems, such as by providing a globally available cloud API. An example of a cloud communications platform as a service that can be used to provide SMS or text messages and VoIP calls is Twilio of San Francisco, Calif. In some embodiments, workers 260 pass to a cloud communications platform one or more of a "call from" phone number, a recipient phone number to call to, and a URL to an audio file to be played on the call.

In some embodiments, campaign controller 250 includes a storage for templates 204. In some embodiments, the data structure of the template information stored for each template record in template storage 204 includes one or more of a template ID, a template name, a template category ID, an indicator of whether or not the template is archived, an indication of the level of sophistication of the template, and a date and time that the template was created and/or updated. In some embodiments, template storage 204 is a relational database. In some embodiments, template storage relational database 204 has a relationship with template details storage 203.

In some embodiments, campaign controller 250 includes a storage for "call from" phone numbers 205. In some embodiments, the data structure of the "call from" phone number information stored for "call from" phone number record in "call from" phone number storage 205 includes one or more of a phone number ID, an abbreviation for one of the state, the province, the region, the county, and the jurisdiction. In some embodiments, the data structure of the "call from" phone number information stored for "call from" phone number record in "call from" phone number storage 205 includes a city name that the phone number is associated with. In some embodiments, the data structure of the "call from" phone number information stored for "call from" phone number record in "call from" phone number storage 205 includes a country code associated with the phone number. In some embodiments, the data structure of the "call from" phone number information stored for "call from" phone number record in "call from" phone number storage 205 includes an area code associated with the phone number. In some embodiments, the data structure of the "call from" phone number information stored for "call from" phone number record in "call from" phone number storage 205 includes a list of other phone number area codes in the same area as the phone number. In some embodiments, the data structure of the "call from" phone number information stored for "call from" phone number record in "call from" phone number storage 205 includes the digits of the phone number. In some embodiments, the data structure of the "call from" phone number information stored for "call from" phone number record in "call from" phone number storage 205 includes an indication of whether or not the phone number can be used in an AIDA campaign. In some embodiments, the data structure of the "call from" phone number information stored for "call from" phone number record in "call from" phone number storage 205 includes an indication of whether or not the phone number can send or receive text messages. In some embodiments, the data structure of the "call from" phone number information stored for "call from" phone number record in "call from" phone number storage 205 includes an indication of whether or not the phone number can be used to send or receive VoIP calls. In some embodiments, the data structure of the "call from" phone number information stored for "call from" phone number record in "call from" phone number storage 205 includes an indication of whether the phone number is an international number. In some embodiments, the data structure of the "call from" phone number information stored for "call from" phone number record in "call from" phone number storage 205 includes a date and time that the record was created and/or updated at. In some embodiments, the AIDA system 215 chooses a "call from" number to send a message to a recipient such that the area code of the "call from" number is the same as the area code of the recipient's phone number.

In some embodiments, campaign controller 250 includes a storage for campaign groups 206. In some embodiments, the data structure of the campaign groups information stored for each campaign group record in campaign groups storage 206 includes one or more of a campaign ID and a group ID. In some embodiments, a record in campaign group storage 206 is used to associate campaign records with group records. In some embodiments, when campaign controller 250 creates a campaign, campaign controller 250 selects one or more groups that the campaign will be sent to, which establishes a relationship between the campaign and one or more groups in groups storage 286. In some embodiments, groups in groups storage 286 are already established and are linked to accounts. In some embodiments, one account may have multiple established groups which are stored in groups storage 286. In one embodiment, groups in campaign groups storage 206, together with memberships storage 287 and groups storage 287 are linked together through relational databases to establish which groups are part of an AIDA campaign, and to establish which users are part of those groups. Groups in campaign groups storage 206 are linked to a campaign ID, to a group ID, and then groups storage 286 links users to groups based on memberships storage 287 which may be a relational database.

In some embodiments, campaign controller 250 includes storage tagging 207 and storage for tags 208. In some embodiments, the data structure of the tagging information stored for each tagging record in tagging storage 207 includes one or more of a record ID, a tag ID, a taggable ID, a taggable type, a tagger ID, a tagger type, a context, and a date and time that the record was created and/or updated. In some embodiments, taggings are used to categorize templates. In some embodiments, taggings in taggings storage 207 indicate an association between a tag from tag storage 208 and a template from template storage 204. The tags and/or tagging may be any type and form of data, identifier, string, etc. to help identify, group, associate or classify certain elements or data, such as by attributes, categories, users and the like. In some embodiments tags are used to categorize templates and may be used to group templates, such as based off a model output or by customer. In some embodiments, the data structure of the tags information stored for each tags record in tags storage 208 includes one or more of a record ID, a tag name, and a taggings count. One example of a tag is "fraud reporting". In one embodiment, there may be one or more templates related to fraud reporting, and the one of more templates related to fraud reporting are all assigned the same fraud reporting tag. Another example of a tag is "appointment reminders".

In some embodiments, campaign controller 250 includes, stores and/or manages one or more campaign recipient actions table(s) in one or more campaign recipient actions storages 220a . . . 220n (220). In some embodiments, the data structure of the actions information stored for each record in the one or more campaign recipient actions table(s) includes one or more of a record ID, a recipient ID, a template ID, a template detail ID, a template ordinal, a type of action, a landing domain ID, and landing page ID, a landing domain, and attachment type, an attachment filename, a sophistication level, a "reply to" address, a "from" display name, a subject, an email system message ID, and email system queue ID, one or more failure codes and one or more error messages, information about the recipient's browser and user agent if the user clicks on a phish URL, a scheduled at date and time, a created at date and time, and an updated at date and time. In some embodiments, when a template is chosen for an AIDA campaign for a given user, the association of the template with the user for the specific AIDA campaign in stored in the campaign recipients actions table in the template ID field. In some embodiments, the one or more campaign recipient actions table(s) store(s) actions for multiple users/recipients. In some embodiments, the template and where the campaign recipient is in that template is a state that is saved by campaign controller 250 in the one or more campaign recipient actions table(s). When a message gets sent to a campaign recipient, that action gets recorded in a record in the one or more campaign recipient actions table(s). That record in the one or more campaign recipient actions table(s) is later used by campaign controller 250 to know that a step in the template has occurred and the campaign should proceed to the next step in the template.

In some embodiments, the campaign controller 250 queries, interfaces or uses records and/or data of the one or more campaign recipient actions table(s) to determine next action(s) to perform or take. For example, when it is time for campaign controller 250 to perform the next action for a given recipient, campaign controller 250 looks in the one or more campaign recipient actions table(s) to determine what the last action was, and then either looks in the template to determine what the next step is, or determines what the next step is using an AI model, and then campaign controller 250 sends a message to action queue 266 to trigger the next action for the campaign recipient. In some embodiments, the message that campaign controller 250 puts into action queue 266 contains one or more of a recipient ID, a template ID, and a detail ID, which is the ordinal value within the template, which refers to which detail page to use. In some embodiments, campaign controller 250 reads the detail ID from the record of the last action for the recipient, stored in the one or more campaign recipient actions table(s), in order to determine what step of the template the recipient is currently on. In some embodiments, the message that campaign controller 250 puts into action queue 266 includes the type of the message to be sent to the recipient, wherein the type is one of an email, an SMS or text message, and VoIP call, or and Internet based communication. In some embodiments, the type of the message to be sent to the recipient is determined based on the template.

In some embodiments, the type of action is one of email, text, call, email delivered, email delivery failed, opened, email clicked, text clicked, reporting using a user interface, error sending text, and error making VoIP call. In some embodiments, when a user clicks the phish URL, one of more of the following information is stored in the action record: user agent, platform, browser, browser version, operating system, whether or not the user is using a mobile device, whether or not the user is a bot, and an IP address.

In some embodiments, campaign controller 250 creates, manages and/or processes records and/or data in campaign recipient actions storage 220. In some embodiments, when campaign controller 250 performs an action on a campaign recipient, campaign controller 250 checks to see if there exists one or more records for that recipient in the one or more campaign recipient actions table(s) in campaign recipient actions storage 220. In some embodiments, if no record exists, then this means that this is a new recipient that has not participated in an AIDA campaign before, and campaign controller 250 creates a new campaign recipient actions table for this recipient, and/or creates a record in the one or more campaign recipient actions table(s) for the action that was performed on this recipient.

In some embodiments, one or more records in the one or more campaign recipient actions table(s) 220 identifies or tracks whether a campaign recipient has been part of an AIDA campaign. In some embodiments, if one or more campaign recipient actions table(s) 220 with one or more records for a campaign recipient exists, then the recipient has been in an AIDA campaign previously. In some embodiments, campaign controller 250 extracts information for that recipient from the one or more campaign recipient actions table(s) 220 in addition to extracting user attributes from users storage 285 and company attributes from accounts storage 284, and campaign controller 250 passes this information to serving module 230.

In some embodiments, campaign controller 250 maintains records of any activity, events, issues, errors, user interactions, user actions, lack of user interactions, etc. (generally referred to activity or events) that have happened to, occurred with, caused by or associated with a given user in all previous AIDA campaigns in the one or more campaign recipient actions table(s) stored in campaign recipient actions storage 220. In some embodiments, both actions and the result of actions get stored in one or more campaign recipient actions table(s). In some embodiments, any data associated with the activity or events is stored, such as but not limited to, data about the computing device, the user, user input, any applications, programs or tasks running on the computing device. In some embodiments, if the phone number for the user was incorrect, this information gets stored in the one or more campaign recipient actions table(s). In some embodiments, if the user opens an email, this information gets stored in the one or more campaign recipient actions table(s). In some embodiments, if the user clicks on a link in a message, this information gets stored in the one or more campaign recipient actions table(s). In some embodiments, the amount of time between sending an action to a recipient and the recipient's response to the action gets stored in the one or more campaign recipient actions table(s). In some embodiments, campaign controller 250 additionally maintains records of all non-AIDA campaigns and/or training programs that the user has completed or been exposed to in the one or more campaign recipient actions table(s) stored in campaign recipient actions storage 220. In some embodiments, one or more of campaign controller 250, serving module 230, workers 260, email workers 261, website workers 264, and security awareness system server 280 can access campaign recipient actions table(s) storage 220.

In some embodiments, while one or more AIDA campaigns are running, campaign controller 250 collects information for all users that are recipients in an AIDA campaign and the information gets stored in the one or more campaign recipient actions table(s), in one or more campaign recipient actions storages 220a . . . 220n. For every campaign, there is a unique user recipient record in campaign recipients storage 202 that is linked to each new action performed on that user for the campaign. In some embodiments, there are multiple campaign recipient action records in the one or more campaign recipient actions table(s). In some embodiments, records in the one or more campaign recipient actions table(s) are linked to a single record in campaign recipients storage 202. In some embodiments, when a user gets added to a new AIDA campaign, a new campaign recipient record in campaign recipient storage 202 will be created for the user that is only linked to the new AIDA campaign. In some embodiments, if the user has already been in an AIDA campaign, and therefore the user already has one or more records in one or more campaign recipient actions table(s), the entries of the actions for a new AIDA campaign get stored in new records in the one or more campaign recipient actions table(s), and the new records are linked to the new campaign recipient record in campaign recipient storage 202, which is linked to the new AIDA campaign which is stored in a record in campaigns storage 201.

In some embodiments, the one or more campaign recipient actions table(s) are stored in campaign recipient actions storage 220. In some embodiments, the one or more campaign recipient actions table(s) are persistent and maintained indefinitely or until a predetermined time period. In some embodiments, the one or more campaign recipient actions table(s) is/are stored forever and does not get deleted. In some embodiments, the one or more campaign recipient actions table(s) are retroactive and only contain actions from that past that have happened, and not actions that will happen in the future. In some embodiments, user actions that are stored in one or more campaign recipient actions table(s) are also reported on the company administrator console 295 so that the company administrator know what happened. In some embodiments, the data within the one or more campaign recipient actions table(s) can be used by dashboard generator 298 in company administrator console 295 to generate reports and visual data displays.

In some embodiments, campaign controller 250 includes one or more workers 260. In some embodiments, workers 260 receive messages from actions queue 266 and perform the actions that the messages describe. In some embodiments, when workers 260 receive a message from actions queue 266, if the action described in the message is to send an email to a recipient, then workers 260 put the message directly into incoming email queue 264 for one or more email workers 261 to pick up and process.

In some embodiments, when workers 260 receive a message from the action queue 266, workers 260 do the task of building the message. In some embodiments, email workers 261 use the information in the message to fetch the detail page of the indicated template from email database 262, and using user specific information from users storage 285, email workers 261 will populate the detail page with the user specific information, and then email workers 261 will put the full composed email into cloud storage, and put the headers of the email into outgoing email queue 265, which sends emails via two or more mail servers. In some embodiments, the cloud storage is an S3 bucket provided by Amazon Simple Storage Service (Amazon S3). In some embodiments, outgoing email queue 265 is an Amazon Simple Queue Service (SQS) queue. In some embodiments, for scaling and redundancy, there are multiple workers 260, and the queue service (for example, Amazon SQS) posts the message from action queue 266 to an available worker 260. In some embodiments, the queue service spreads messages from actions queue 266 evenly across multiple workers 260.

In some embodiments, workers 260 determine the recipient of the message, and look up the recipient in campaign recipient storage 202 to determine the campaign the recipient is in, then workers 260 look up the campaign in campaigns storage 201, and then workers 260 look up the one or more records in the one or more campaign recipient actions table(s) to determine the template to use, and then workers 260 look up the detail page of the template using the detail ID.

In some embodiments, if the detail page of the template is a text message, the worker retrieves the data required to send the test message to the recipient, for example the recipients mobile phone number, from users storage 285, and then workers 260 build the text message and send it through the Twilio service. In some embodiments, if the detail page of the template is an email, then workers 260 forward the message exactly as they received it to incoming email queue 264 for email workers 261 so that they can build the email message for the recipient. In some embodiments, workers 260 have a template fetcher which builds the message, retrieving user specific information that is built into the email message and incorporated into the detail page of the template.

In some embodiments, campaign controller 250 includes one or more email workers 261. In some embodiments, email workers 261 generate email messages. In some embodiments, email workers 261 interface with two queues; incoming email queue 264 and outgoing email queue 265. In some embodiments, incoming email queue 264 indicates that it is time to send an email message. The message to do this action come to email workers 261 from campaign controller 250 via workers 260. In some embodiments, the message to generate an email message contains the recipient ID, the template ID, and the detail ID. In some embodiments, email workers 261 compose the email, put the email body and the email headers together, and put the completed email address in outgoing email queue 265 until it gets processed. In some embodiments, email workers 261 only put the email header in outgoing email queue 265 until it gets processed. In some embodiments, once the email gets sent, campaign controller 250 updates the one or more campaign recipient actions table(s) to reflect that the AIDA system delivered the email to the recipient, and the email header is removed from the outgoing email queue 265. In some embodiments, email workers 261 have an email database 262 which contains a queue table, message headers, and a transient table where the state is stored.

In some embodiments, campaign controller 250 includes one or more website workers 263. In some embodiments, when a recipient opens an email, clicks on a link in an email or a text message, or otherwise interacts with the action sent to them, website worker 263 serves up the landing page from landing page storage 283 to the recipient. In some embodiments, website workers 263 present the recipient with any training that they must complete at the moment of failure. In some embodiments, when a recipient fails a simulated phishing test, website workers 263 enroll the user in remedial training that will take place at some time in the future.

In some embodiments, website workers 263 track one or more of the following information: which recipients interacted with a link, what browsers the recipients were using when they interacted with a link, what the recipient's user agent was when they interacted with a link. In some embodiments, website workers 263 record the recipient's actions in one or more campaign recipient actions table(s). In some embodiments, when campaign controller 250 wants to send a VoIP message, worker 260 that receives that message from action queue 266 and asks website worker 263 what message to send. In some embodiments, anything that the AIDA system 215 tracks and any actions taken by the recipients are automatically sent to website workers 263. In some embodiments, if a recipient replies to a text message, the recipients response is stored by website workers 263. In some embodiments, if a user replies to an AIDA simulated phishing message, their reply gets delivered to a special email address that is connected to an AWS Simple Notification Service (SNS). In some embodiments, the SNS sends this reply email to an AWS Lambda endpoint (AWS Lambda) which stores the reply email in an S3 bucket. When the reply email gets stored in the S3 bucket, security awareness system server 280 gets notified that there is a new email reply which creates a record in the one or more campaign recipient actions table(s) which is/are monitored by campaign controller 250.

In some embodiments, landing pages are served to a recipient by website workers 263 when a user interacts with a link in a message. In some embodiments, all the information about the recipient comes back to campaign controller 250 through the URL that the recipient interacted with, as this URL is created specifically for each recipient and it has at least the recipient ID and the detail ID in it. In some embodiments, the information in the URL is encrypted.

D. Artificial Intelligence Models

Figure 3:
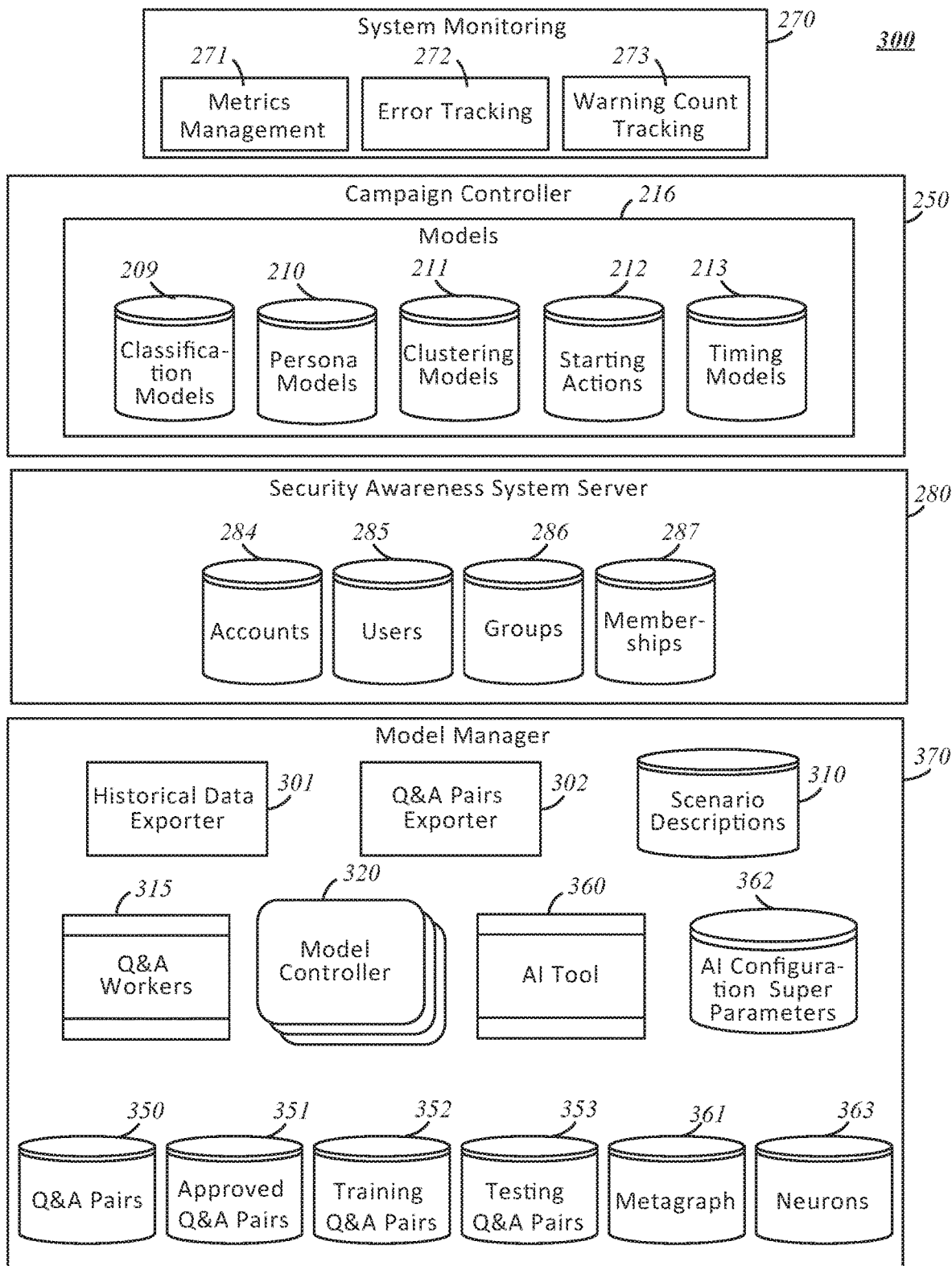
FIG. 3 depicts an implementation of some of the architecture of an implementation of a system capable of creating artificial intelligence models for use as part of a security awareness system.

Referring to FIG. 3 in a general overview, FIG. 3 depicts an embodiment of a system 300 used for creating, updating, and managing models, such as artificial intelligence or machine learning models, for use in AIDA simulated phishing campaigns. System 300 includes campaign controller 250, security awareness system server 280, system monitoring module 270, and model manager 370. Artificial intelligence refers to computer systems which exhibit intelligent behavior, including the capacity to learn, maintain a large storehouse of knowledge, use reasoning, apply analytic abilities, discern relationships between facts, communicate ideas to others and understand communications from others, and perceive and make sense of the situation. Machine learning systems create new knowledge by finding previously unknown patterns in data, driving solutions by learning patterns in data.

Neural networks are computer systems designed, constructed and configured to simulate the human nervous system. The neural network architecture consists of an input layer, which inputs data to the network; an output layer, which produces the resulting guess from the network; and a series of one or more hidden layers, which assist in propagating. Such systems learn to do tasks or make decisions by considering examples. A neural network or artificial neural network is based on a collection of connected units called neurons or artificial neurons. Each connection (synapse) between neurons can transmit a signal to another neuron. The receiving (postsynaptic) neuron can process the signal(s) and then signal downstream neurons connected to the neuron. Neurons may have state, generally represented by real numbers, typically between 0 and 1. Neurons and synapses may also have a weight that varies as learning proceeds, which can increase or decrease the strength of the signal that it sends downstream. Further, neuron may have a threshold such that only if the aggregate signal is below (or above) that level is the downstream signal sent. Typically, neurons are organized in layers. Different layers may perform different kinds of transformations on their inputs. Signals travel from the first (input), to the last (output) layer, possibly after traversing the layers multiple times. In artificial networks with multiple hidden layers, the initial layers might detect primitives (e.g. the pupil in an eye, the iris, eyelashes, etc.) and their output is fed forward to deeper layers who perform more abstract generalizations (e.g. eye, mouth) . . . and so on until the final layers perform the complex object recognition (e.g. face).

Neural networks are trained with data, such as a series of data points. The networks guess which response should be given, and the guess is compared against the correct of "best" guess for each data point. If errors occur, the neurons are adjusted, and the process repeats itself. Training a neural network model corresponds to selecting one model from the set of allowed models. A model may be established by selection of a neural network configured, programed or trained in a certain way with certain data.

In the context of the AIDA system, neural networks may be trained with data related to simulated phishing campaigns to create or establish models that direct, identify or specify how to configure and/or execute a simulate phishing campaign. As such, the training of neural networks applies machine learning to data from and associated with results of simulated phishing campaigns to establish models for simulated phishing campaigns. A model for a simulated phishing campaign may take as input any type and form of information related to the simulated phishing campaign, such as but not limited to attributes of user, attributes of the company of the users, date and temporal information, previous actions, user history, template information, previous types of messages communicated, timing information, etc. The model may output any information for creating, executing and/or managing a simulated phishing campaign, such as but not limited to a first action to perform, a next action to perform, a persona to use, a template to use, content of the template, type of message/communication, timings of message/communications, etc.

The AIDA system 215 uses information related to simulated phishing communications and campaigns to develop, establish and or train models. In some embodiments, the AIDA system uses question and answer pairs and/or information learned from past simulated phishing campaigns to create models which are able to target the greatest vulnerabilities of a user. In some embodiments, AIDA system 215 can combine redacted information across multiple companies (accounts) and determine the greatest vulnerability of a specific industry, or a specific geographic region, or of a specific population demographic, or of a specific organizational level, as examples.

One type of artificial intelligence or machine learning model used by AIDA system 215 is a persona model. In one embodiment, persona models are stored in persona models storage, 210. A persona model is a persona that AIDA system 215 uses to communicate with users. The persona model may be a model configured, established or trained to represent a certain type or category of person. The persona model may be a model configured, established or trained to represent a certain type of persona or personality. The persona model may be a model configured, established or trained to represent a certain type or category of job, occupation or role. In some embodiments, a persona model is a dental office assistant. In some embodiments, a persona model is a travel agent. In some embodiments, a personal model is a credit card company. In some embodiments, a persona model is a technical support representative. In some embodiments, a persona model is a technical support representative for Facebook, created by Facebook, Inc. of Menlo Park, Calif.

In one embodiment, models are created by model controller or manager 320. In a general overview, model manager 370 includes storages for question and answer pairs (Q&A pairs) 350, storage for question and answer pairs used for training (training Q&A pairs) 352, storage for questions and answer pairs that are used for testing (testing Q&A pairs) 353, and storage for question and answer pairs that are approved (approved Q&A pairs) 351. In some embodiments, model manager 370 includes historical data exporter 301, and Q&A pairs exporter 302. In some embodiments, model manager 370 includes model controller 320, Q&A workers 315, and AI tool 360. Model manager 370 may include storages for scenario descriptions 310, storages for metagraph 361, storages for neurons 363, and storages for AI configuration super parameters 362.

In some embodiments, model manager 370 includes worker interface 314. The worker interface may comprise any type and form of executable instructions, such as an application, program, service, process, task or API, executable one or more processors, for interfacing and/or communications with one or more workers. The worker interface may be designed, constructed and/or configured to prompt, query, ask or request information, input or to work on a task from one or more workers. For example, the worker interface may include or provide a user interface that provides information on a queue, a task and/or status of a task. The worker interface may be designed, constructed and/or configured to receive and/or obtains information from one or more workers. For example, the worker interface may include or provide a user interface that receives information from a work, such as input, or results from or status of a task. In some implementations, the work interface is designed, constructed and/or configured to interface and/or communicate with a user, such as a user performing a task of as worker. In some implementations, the work interface is designed, constructed and/or configured to interface and/or communicate with a system, application, program, etc., that is to perform one or more tasks. For example, in some embodiments, Q&A workers 315 may be a model, or may be an automated software agent. In some embodiments, worker interface 314 is a model, a program, a function, a module, an automated software agent or software instructions operating on one or more processors that interfaces with one or more person. In some embodiments, worker interface 314 organizes task queues, job queues, tasks and/or jobs. In some embodiments, worker interface 314 passes information to Q&A workers 315 and/or receives information from Q&A workers 315. Worker interface 315 may invite, un-invite, select, or deselect Q&A workers 315.

In one embodiment, models are created by creating question and answer pairs. In some embodiments, a service such as Amazon Mechanical Turk (MTurk) is used to create question and answer pairs. In some embodiments, questions are recipient responses to messages sent to a recipient by AIDA system 215, and answers are the AIDA system responses to the recipients responses to AIDA system messages. In some embodiments, the question and answer pairs are stored in Q&A pairs storage 350. In some embodiments, only the question and answer pairs that have not yet been validated are stored in Q&A pairs storage 350. In some embodiments, the question and answer pairs are validated by Q&A workers 315 and then stored in approved Q&A pairs storage 351. In some embodiments, validated Q&A pairs in approved Q&A pairs storage 351 are divided into two or more groups of Q&A pairs. In some embodiments, one or more group of Q&A pairs is used for training models and is stored in training Q&A pairs storage 352. In some embodiments, one or more group of Q&A pairs is used for testing models and is stored in testing Q&A pairs storage 353.

In some embodiments, Q&A workers 315 are MTurk workers. In some embodiments, a model is trained by feeding it a number of approved questions which represent example AIDA system messages that a specific model could send to a recipient, along with a number of approved answers which represent appropriate responses to the approved questions.

In some embodiments, model controller 320 creates jobs for Q&A workers 315 to develop Q&A pairs. In some embodiments, the job requests give an example of the messages that campaign controller 250 sends to a user, in addition to examples of good Q&A pairs. In some embodiments, model controller 320 additionally gives Q&A workers 315 examples of poor Q&A pairs. In some embodiments, while model controller 320 is utilizing Q&A workers 315 to create Q&A pairs, system monitoring module 270 maintains a dashboard of all the jobs being performed by Q&A workers 315.

In some embodiments, a first task given to Q&A workers 315 by model controller 320 is to create Q&A pairs, comprising user responses to an AIDA system message (questions) and the AIDA system responses to the user responses (answers). In some embodiments, Q&A workers 315 are given a scenario description from scenario descriptions storage 310, which includes the original AIDA system message or messages, and Q&A workers 315 are first asked to create replies or questions that the recipient may ask the AIDA system, and then Q&A workers 315 are asked to create an appropriate answer that the system could respond to the recipients replies or questions with. In some embodiments, model controller 320 informs Q&A workers 315 that the generated recipient responses (the questions) should be representative of the way a user would respond if they received the AIDA system message that was detailed in the scenario description.

In some embodiments, model controller 320 informs Q&A workers 315 to create system replies to recipient responses (answers) that will encourage the recipient to interact with a link in a simulated phishing message. In some embodiments, model controller 320 informs Q&A workers 315 to apply criteria to creating the system responses (answers) that are created for the recipient responses (questions). In some embodiments, model controller 320 informs Q&A workers 315 to use proper grammar and spelling in the system responses (answers). In some embodiments, model controller 320 informs Q&A workers 315 to not use slang in the system responses (answers). In some embodiments, model controller 320 informs Q&A workers 315 that the recipient responses to the AIDA system messages (the questions) may incorporate slang, spelling mistakes, profanities, typical shorthand, and urban grammar.

In one embodiment, a sample AIDA system email message provided by model controller 320 to Q&A workers 315 is:

This email is to confirm a password reset was just requested for your account. If you did not request this, please visit the following link: http://secure.social-tech.com/accounts/password-reset-request/?uuid=9431edpoks&language=en&reset=reject Otherwise you will be locked out of your SocialTech account.
Thank you,
SocialTech.

In one embodiment, an example of an AIDA system SMS or text message provided by model controller 320 to Q&A workers 315 is:

A password change was requested. We want to verify this is you. If you did not request a password change please click this link http://bit.ly/2hXJZd6 or you will be locked out of your SocialTech account.

In some embodiments, the task given to Q&A workers 315 by model controller 320 is to create Q&A pairs, where all the questions and answers are to be different. In one embodiment, an example of acceptable question and answer pairs are as follows:

Question 1: I don't have a SocialTech account
Answer 1: Sorry, but someone requested a password reset on your account.
Please click the link to verify or dispute this.
Question 2: When will I get locked out?
Answer 2: You have 8 hours to click the link to verify or dispute the password reset, after which you will be locked out of your Social Tech account.

In some embodiments, the goal of the system response (answer) to the recipient response (question) is to get the recipient to interact with or click on a link, therefore answers to questions which do not move the user towards this action are not acceptable. In one example, if the system response (answer) created by Q&A worker 315 is that the recipient should "Call customer service", this response would not encourage the recipient to click on a link and therefore would not be acceptable. Similarly, system responses (answers) that are phrased in a way which would elicit further recipient responses (questions) or would encourage the recipient to disregard the system message are not acceptable.

In some embodiments, once Q&A workers 315 have created Q&A pairs which may be stored in Q&A pairs storage 350, Q&A workers 315 are asked to review and validate the created Q&A pairs to see if they are acceptable. In some embodiments, Q&A worker 315 responds to the appropriateness of the questions and the answers with a binary reply, for example one of yes if the question or answer is acceptable and zero or no if the question or answer is not acceptable. In some embodiments, each Q&A pair is reviewed by more than Q&A worker 315. In some embodiments, the Q&A pairs are only considered approved if all of the Q&A workers 315 that review the Q&A pairs deem the questions and the answers to be acceptable. In some embodiments, the Q&A pairs that are considered approved are stored in approved Q&A pairs storage 351. In some embodiments, the Q&A pairs are considered approved by one or more or all of the Q&A workers 315 that reviewed the Q&A pairs are further reviewed by a trusted person before being stored in approved Q&A pairs storage 351.

In some embodiments, model manager 370 includes Q&A pairs exporter 302. In some embodiments, Q&A pairs exporter 302 extracts question and answer pairs from approved Q&A pairs storage 351 and creates intermediate files. In some embodiments, the one or more intermediate files are used for the input into a data prep program which separates the Q&A pairs into two groups. In some embodiments, one group is used for initialization and/or training of a neural network for a model, and one group is used for testing the neural network for the model. The Q&A pairs in the first group are stored in training Q&A pairs storage 352, and the Q&A pairs in the second group are stored in testing Q&A pairs storage 353. In some embodiments, training Q&A pairs storage 352 and testing Q&A pairs storage 353 are MySQL databases which are hosted on Amazon AWS RDS.

In some embodiments, the Q&A pairs generation and validation process is done for every model that is generated. In some embodiments, the Q&A pairs generation and validation process is fully automated. In some embodiments, some portions of the Q&A pairs generation and validation process are automated. In some embodiments, responses given by recipients in AIDA campaigns are used as questions for the Q&A pairs generation and validation process.

In some embodiments, the models created by model manager 370 are stored in model storage 216. In some embodiments, model storage 216 is part of campaign controller 250. In some embodiments, model storage 216 is part of model manager 370. In some embodiments, model storage 216 is stored in memory 122 as part of AIDA system 215. In some embodiments, model storage 216 is stored in a cloud storage, for example an S3 bucket.

In some embodiments, the model manager 370 may create persona models that are stored in person model storage 210. Persona models are created to represent a specific role or entity as previously described. In some embodiments, model manager 370 may create classifications models that are stored in classification model storage 209. Classification models are variants of persona models for groups or segments that share one or more common attributes. Classification models are more tightly aligned with the group or segment. In some embodiments, classification models may be created for different industries. In some embodiments, classification models may be created for different demographics. In some embodiments, classification models may be created for different organizational levels within a company. For example, a classification model for recipients at a director level may be created. Classification models may be created for any user attribute or combination of attributes that a group of users can be built around. Q&A pairs that are specific to the segment are used to train and test the classification model. In some embodiments, the questions for the questions and answer pairs are extracted from actual responses to messages sent to the recipients from campaign controller 250, wherein the recipients are part of a group of recipients that share one or more attributes.

In some embodiments, once the model is trained, Q&A pairs from testing Q&A pairs storage 353 are used to validate the model's behavior. In some embodiments, the answers that a trained model generates during a testing phase are reviewed by one or more Q&A workers 315 to determine how appropriate they are. In some embodiments, Q&A workers 315 use a ranking to represent how close the answers generated by the model are to the answers of the testing Q&A pairs. In some embodiments, the answers generated by the model to the questions of the testing Q&A pairs are graded on a Likert scale with 1 being the worst response and 5 being the best response.

In some embodiments, model controller 320 determines model parameters when creating a model using a neural network. In some embodiments, model controller 320 determines how many neurons will be in the model. In some embodiments, model controller 320 determines how many layers will be in the model. In some embodiments, model controller 320 determines one or more of an amount of backpropagation, a dimension, and a learning rate. In some embodiments, the model parameters determined by model controller 320 when creating a model are referred to as AI configuration super parameters. In some embodiments, AI configuration super parameters are part of a TensorFlow configuration. In some embodiments, AI configuration super parameters are set in Python code or as command line parameters for a python program that trains a model. In some embodiments, the AI configuration super parameters are stored in AI configuration super parameters storage 362. In some embodiments, AI configuration super parameters are stored in a bash script format in AI configuration super parameters storage 362. In some embodiments, AI configuration super parameters are stored in project notes or a readme file in AI configuration super parameters storage 362.

In some embodiments, a model that results from a training and testing process is stored as one of integer values or real values in a matrix in model storage 216. In some embodiments, the matrix aligns to a word matrix. In some embodiments, after the model is built, the model may be further adjusted using a tuning process that adjusts the values of the neurons. In some embodiments, the values of the neurons may be stored in neuron storage 363. In some embodiments, the values of the neurons may be stored with the model in model storage 216. In some embodiments, a model that results from a training and testing process further comprises a metagraph. In some embodiments, a metagraph is a list of operations to execute, and which model inputs to pass to the list of operations. In some embodiments, a metagraph is built by writing a python program that calls TensorFlow APIs to create an execution graph which is stored in memory. In some embodiments, saving an execution graph to a memory creates a metagraph. In some embodiments, a metagraph is a stored version of the in-memory execution graph and is stored in metagraph storage 361. In some embodiments the metagraph is used to execute steps of a neural network. In some embodiments, the metagraph is stored with the model in model storage 216. In some embodiments, serving module 230 retrieves a model from model storage 216 and a corresponding metagraph from metagraph storage 361 and makes the model and the metagraph available to campaign controller 250.

In some embodiments, a model represents a persona. Models may be associated with multiple campaigns, as more than one model may be used in a campaign. Each model may have one or more versions. In some embodiments, AIDA system 215 includes a table which contains a list of all models and the versions of the models that may be used. In some embodiments, a usage counter is maintained for every version of a model, and each time the version of the model is used in an AIDA campaign, the usage counter is incremented. In some embodiments, the model version with the lowest usage count is the next model to be used by a campaign controller. In some embodiments, a security awareness system administrator 288 may set a target use percentage for one or more version of a model. In some cases, campaign controller 250 will use a version of a model for a campaign based on which version of a model is farthest below its target use percentage.

In some embodiments, models are created which select a preferred, or desired kind of training for a user based on recipient information and/or recipient actions when they fail a phishing campaign. In some embodiments, training models are created based on a user's behavior in an AIDA campaign subsequent to completing specific training materials. In some embodiments, training models are created based on a user's behavior in an AIDA campaign after the user has failed a previous simulated phishing campaign and has received training targeted towards the failure mode of the user.

In some embodiments, information from simulated phishing campaigns, information about users, information about accounts, and other information can be used to create new models and to update existing models. For example, one or more neural networks may be trained using results of simulated phishing campaigns, information about users of that simulated phishing campaign and through training establish one or more models. This information may, for example, highlight behavioral differences between people which may be used by the classification models to create segmentations of users into different groups based on certain attributes, wherein each group gets targeting with a specific persona model based on the likelihood that the specific persona model will increase the probability of the user interacting with a link. In some embodiments, historical information is pulled from one or more campaign recipient actions table(s) by historical data exporter 301 and formatted to be used to create a new model or update an existing model to create a new version of an existing model.

Models may be created for segmentations of a population, for clusters in a population, and for any group of a population. For example, a neural network may be trained with data regarding a segment to establish a model for that segment. In some embodiments, AIDA model controller 320 creates one or more models for an individual company (account).

In some embodiments, for a user that has not been part of an AIDA simulated phishing campaign, campaign controller 250 may redact information from users that are grouped according to similar attributes using one or more classification models (e.g. users that are in the same or similar industry, users that have similar seniority in a company, users that perform a similar role in an organization, users that have been with an organization for a similar length of time, users that are in similar geographic locations, etc.). The one or more classification models built using redacted information from users with similar attributes may be used along with personal and generic information for the new user to customize an AIDA campaign for that user, thereby creating an appropriate first AIDA campaign for a user that has no previous AIDA campaign history.

In some embodiments, statistical models may be used for persona models, classification models, clustering models, timing models, or any other type of model. In some embodiments, logistic regression models may be used for persona models, classification models, clustering models, timing models, or any other type of model. In some embodiments, k-means models may be used for persona models, classification models, clustering models, timing models, or any other type of model. In some embodiments, polynomial regression models may be used for persona models, classification models, clustering models, timing models, or any other type of model. In some embodiments, models may be based on deep neural networks, which can be used to create models including, for example, statistical models such as logistic regressions. In some embodiments, a deep neural network used is a sequence to sequence (seq2seq) deep neural networks model (also known as neural machine translation).

In some embodiments, information about a user that has interacted with a link, such as one or more of a browser the user was using when they performed the action, whether the user performed the action on their phone, a time of the action, an email client used, an IP address of the user, a browser user agent, a user's operating system, and a browser version may be used to create models, to choose a model for a specific user, or as a feedback loop to include behavior in serving module 230 which may inform things such as a next action in a template, a next template detail page, a next timing for sending a next message, etc.

In some embodiments, one or more historical data exporters 301 reads data from one or more storages and creates files in the correct format needed by the model controller 320 to train new models, retrain existing models, or tune existing models. In some embodiments, one or more historical data exporter s301 reads data from campaigns storage 201. In some embodiments, one or more historical data exporters 301 reads data from campaign recipients storage 202. In some embodiments, one or more historical data exporters 301 reads data from campaign recipient actions storage 220. In some embodiments, one or more historical data exporters 301 reads data from scenario descriptions storage 310.

Referring to FIG. 4 in a general overview, FIG. 4 depicts an implementation of a method 400 for creating a simulated phishing campaign for a user based on at least a history of the user with respect to simulated phishing campaigns. In a brief overview, the method 400 may include identifying, by a campaign controller, a simulated phishing campaign history of a user, the simulated phishing campaign history comprising information on events associated with the user during one or more previous simulated phishing campaigns (step 400). The method can include determining, by the campaign controller based at least on the simulated phishing campaign history of the user, a model from a plurality of models for creating a simulated phishing campaign directed to the user (step 420). The method also can include creating, by the campaign controller responsive to the determination, the simulated phishing campaign using the model (step 440).

Referring again to FIG. 4, and in greater detail, the method 400 may include identifying, by a campaign controller, a simulated phishing campaign history of a user, the simulated phishing campaign history comprising information on events associated with the user during one or more previous simulated phishing campaigns (step 400). In some embodiments, the campaign controller identifies the simulated phishing campaign history of the user from an action table of the user. In some embodiments, every user that has been a part of a simulated phishing campaign has one or more records in one or more campaign recipient action table(s) associated with them. In some embodiments, when the campaign controller starts a new campaign for that user, if the user does not have one or more records in one or more campaign recipient actions table(s) associated with them, then the campaign controller creates a record in a campaign recipient action table for the user.

In some examples, the action table is used to store every action performed upon the user, and every action performed by the user, during one or more previous simulated phishing campaigns. For example, the actions table may include one or more of details and timing of simulated phishing communications sent by the campaign controller to the user. The actions table may include whether or not the user interacted with a link in one or more simulated phishing communications sent to the user. The actions table may include one of more of details and timing of a response of a user to a simulated phishing communication. In some examples, the action table associated with a user includes all training modules or programs that the user has been exposed to. In some embodiments, the campaign controller stores other information in the action table associated with the user, for example the campaign controller may store one or more of the following information: the browser a user was using when they performed an action, the browser user agent, the browser version, the operating system, a type of device the user was using when they performed an action, the email client that a user uses, and the time of the action that the user performed.

In some embodiments, the association of a template to be used for a user during a simulated phishing campaign is stored in the action table associated with the user. In some embodiments, the action table associated with a user consists of one or more records for a campaign. In some embodiments, one or more records in the action table associated with the user are associated with a single record in a campaign recipients table which is associated with a simulated phishing campaign. In some embodiments, the campaign controller identifies a plurality of attributes of the user. In some embodiments, the campaign controller combines some or all of the information from the action table associated with the user together with one or more of the identified user attributes. In some embodiments, the campaign controller passes the information from the action table associated with the user and the one or more of the user attributes to the serving module.

The method 400 can include determining, by the campaign controller based at least on the simulated phishing campaign history of the user, a model from a plurality of models for creating a simulated phishing campaign directed to the user (step 420). In some embodiments, historical information is extracted from an action table associated with the user and reformatted in one or more of a tabular format, a Python program, and a script. In some embodiments, a model is determined for a user based on one or more training programs associated with phishing taken by the user. In one embodiment, the model may be determined based on one or more attributes of a plurality of attributes determined for the user.

In some embodiments, determining a model from a plurality of models for creating a simulated phishing campaign directed to the user comprises determining, based at least on the simulated phishing history of the user, a template from a plurality of templates to use for the simulated phishing campaign directed to the user. The determined template may be associated with a model determined for the user. In some embodiments, the campaign controller determines, based at least on the simulated phishing campaign history of the user, content within the template to use for the simulated phishing campaign directed to the user. In some examples, based at least on the simulated phishing campaign history of the user, the campaign controller determines one or more types of training for the user if the user interacts with a link of a simulated phishing communication of the simulated phishing campaign.

In some embodiments, the campaign controller may use information about the user, for example information identified in the action table associated with the user or information identified from one or more of the user attributes or information about a training history of a user, to classify the user into a cluster of a plurality of clusters, the cluster corresponding to a model of a plurality of models. In some embodiments, the campaign controller may use information about the user, for example information identified in the action table associated with the user or information identified from one or more of the user attributes or information about a training history of a user, to classify the user into a cluster of a plurality of clusters corresponding to a plurality of timing models. In some embodiments, a timing model of the plurality of timing models identifies an hour of the day for communicating a simulated phishing communication for the simulated phishing campaign. In some embodiments, a timing model of the plurality of timing models identifies a number of times to communicate a simulated phishing communication for the simulated phishing campaign.

The method can also include creating, by the campaign controller responsive to the determination, the simulated phishing campaign using the model (step 440). In some embodiments, the campaign controller creates the simulated campaign including a choice of steps in a template to perform in the simulated phishing campaign for the user which are determined according to the model. In some examples, the model may indicate the selection of content to use in performing one or more steps in a template in the simulated phishing campaign for the user. In some embodiments, the model may indicate one or more of a starting action, a starting time, and a starting type of communication to use by the campaign controller when creating a simulated phishing campaign for the user.

Figure 5:
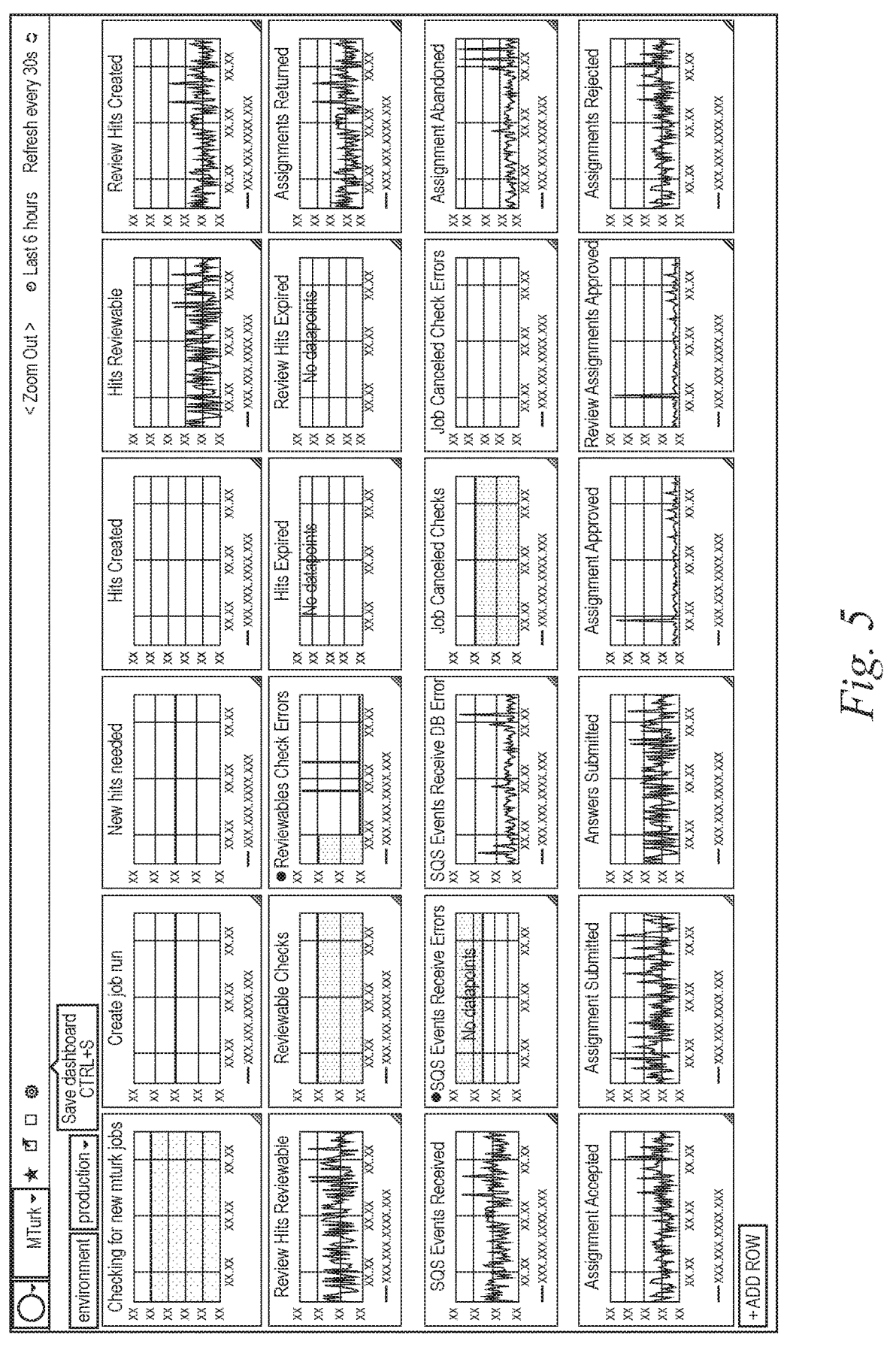

FIG. 5 depicts an example output of a system monitoring module monitoring the creation of one or more models. In some embodiments, the system monitors assignments for workers. In some examples, the system monitors one or more of assignments returned, assignments abandoned, assignments rejected, assignments accepted, assignments submitted, and assignments approved. In some embodiments, the system monitors one or more of SQS events received, SQS event receive errors, and SQS event receive database errors. The system monitor may monitor one or more of job canceled checks, job canceled check errors, checking for new jobs and creating job runs. In some examples, the system may monitor one or more of new hits needed, hits created, hits reviewable, review hits created, review hits reviewable, reviewables checks, reviewables check errors, review hits expired, review assignments approved, and answers submitted. In some embodiments, a system administrator may determine the time period over which to display the monitored information. In some embodiments, a system administrator may determine the refresh rate of the monitored information.

FIG. 6 depicts an example input screen for a company administrator console to create an AIDA campaign. In some embodiments, the AIDA campaign creation screen allows a company administrator to name a campaign. In some examples, a company administrator can set one or more of the starting time, starting date, and time zone for the campaign. In some embodiments, the company administrator to select and/or create user groups for the campaign. The company administrator may choice whether to allow text messages and allow VoIP calls as part of the new AIDA campaign.

Figure 7:
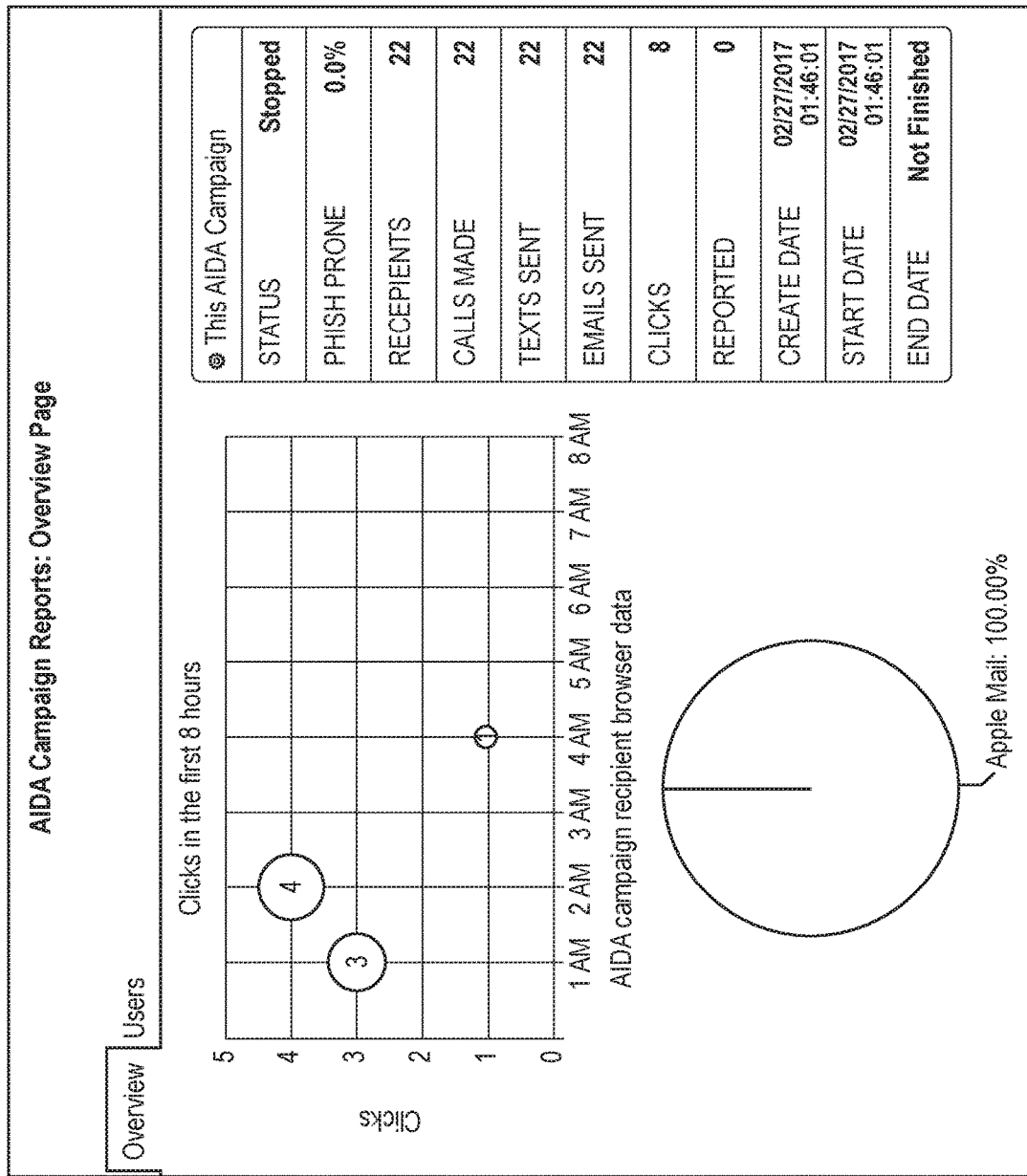
FIG. 7 depicts a company administrator console dashboard showing an overview summary of an AIDA campaign.

FIG. 7 depicts a company administrator console dashboard showing an overview summary of an AIDA campaign generated by a dashboard generator. In some embodiments, dashboard generator 298 generates a display of the number of times a user interacts with a link in a simulated phishing message that is part of an AIDA campaign over a given time period after the start of the AIDA campaign. In some embodiments, dashboard generator 298 generates a display of the number of times a user has interacted with a link in each of the first number of time periods after the start of an AIDA campaign. In some embodiments, the time period is one hour. In some embodiments, dashboard generator 298 displays a circle with a size that is proportionate to the number of interactions with a simulated phishing message in a time period, wherein the greater the number of user interactions with links in simulated phishing messages, the larger the size of the circle that is displayed. In some embodiments, dashboard generator 298 displays the status of the AIDA campaign as one of stopped, started, paused, ongoing, discontinued, completed, finished, cancelled, restarted, or aborted. In some embodiments, dashboard generator 298 displays the date and time that an AIDA campaign was created on. In some embodiments, dashboard generator 298 displays the date an AIDA campaign was started on. In some embodiments, dashboard generator 298 displays the end date of an AIDA campaign. In some embodiments, if the campaign is one of stopped, paused, ongoing, discontinued, cancelled, restarted, or aborted, the end date is displayed as "Not Finished". In some embodiments, the company administrator can highlight a specific recipient and see all the actions performed on that recipient (e.g. messages sent to the recipient, what detail page was used, when the message was sent, etc.) and all the actions that the recipient performed (e.g. clicked on a link in a text message, responded to an email, etc.). For example, if there is a record in the one or more campaign recipient actions table(s) indicating that the campaign controller 250 sent them an email, then the company administrator can click on this action and the company administrator console 295 displays a copy of the detail page of the template that was used to generate the email that the user received. In some embodiments, dashboard generator 298 displays information about the browser, agent or platform that the user uses to view the messages of a campaign. In some embodiments, dashboard generator 298 displays information about multiple user's browsers, agents, or platforms in a pie chart format.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
classifying, by one or more processors, each user of a plurality of users into a cluster of a plurality of clusters, each of the plurality of clusters corresponding to a model of a plurality of models, each of the plurality of models specifying how to create a simulated phishing communication for users of a corresponding cluster;
identifying, by the one or more processors, the cluster of the plurality of clusters to which a user is classified;
identifying, by the one or more processors, the model corresponding to the cluster to which the user is classified; and
creating, by a campaign controller, the simulated phishing communication using information provided as output by the model.

2. The method of claim 1, further comprising classifying, by the one or more processors, each user into the cluster of the plurality of customers using information about the user.

3. The method of claim 1, wherein the model receives as input information about the cluster of users.

4. The method of claim 3, wherein the model provides the output responsive to receiving the input.

5. The method of claim 1, wherein the model is a timing model that identifies a timing of when to communicate the simulated phishing communication.

6. The method of claim 1, wherein the model is a timing model that identifies a number of times to communicate the simulated phishing communication.

7. The method of claim 1, wherein the model is an artificial intelligence model configured to receive as input one or more attributes of the cluster of users and provide as output information on how to create the simulated phishing communication.

8. The method of claim 1, wherein the model is a persona model configured to receive as input a question from the user and provide as output a response to the question.

9. A system comprising:
one or more processors, coupled to memory and configured to:
classify each user of a plurality of users into a cluster of a plurality of clusters, each of the plurality of clusters corresponding to a model of a plurality of models, each of the plurality of models configured to specify how to create a simulated phishing communication for users of a corresponding cluster;
identify the cluster of the plurality of clusters to which a user is classified;
identify the model corresponding to the cluster to which the user is classified; and
create the simulated phishing communication using information provided as output by the model.

10. The system of claim 9, wherein the one or more processors are further configured to classify each user into the cluster of the plurality of clusters using information about the user.

11. The system of claim 9, wherein the model receives as input information about the cluster of users.

12. The system of claim 11, wherein the model provides the output responsive to receiving the input.

13. The system of claim 9, wherein the model is a timing model that identifies a timing of when to communicate the simulated phishing communication.

14. The system of claim 9, wherein the model is a timing model that identifies a number of times to communicate the simulated phishing communication.

15. The system of claim 9, wherein the model is an artificial intelligence model configured to receive as input one or more attributes of the cluster of users and provide as output information on how to create the simulated phishing communication.

16. The system of claim 9, wherein the model is a persona model configured to receive as input a question from the user and provide as output a response to the question.

17. A system comprising:
one or more processors, coupled to memory and configured with a plurality of models that specify how to create a simulated phishing communication for a user;
wherein the one or more processors are configured to:
receive identification of a user;
classify the user into a cluster of a plurality of clusters, each of the plurality of clusters corresponding to a model of the plurality of models; and
create the simulated phishing communication using information provided as output by the model.

18. The system of claim 17, wherein the model of the plurality of models comprises an artificial intelligence model trained using results of previous simulated phishing communications.

19. The system of claim 17, wherein the model of the plurality of models is configured to receive as input information about the user and provide as output information on how to create the simulated phishing communication.

20. The system of claim 17, wherein the model of the plurality of models comprises a timing model that specifies one of a frequency or timing of the simulated phishing communication.

* * * * *